United States Patent
Chen et al.

(10) Patent No.: US 12,097,651 B2
(45) Date of Patent: Sep. 24, 2024

(54) MOLDING DEVICE AND MOLDING METHOD

(71) Applicant: KING STEEL MACHINERY CO., LTD., Taichung (TW)

(72) Inventors: Ching-Hao Chen, Taichung (TW); Liang-Hui Yeh, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 0 days.

(21) Appl. No.: 17/818,425

(22) Filed: Aug. 9, 2022

(65) Prior Publication Data
US 2024/0051204 A1 Feb. 15, 2024

(51) Int. Cl.
| | | |
|---|---|---|
| B29C 45/34 | (2006.01) | |
| B29C 45/04 | (2006.01) | |
| B29C 45/26 | (2006.01) | |
| B29L 31/50 | (2006.01) | |

(52) U.S. Cl.
CPC .......... *B29C 45/34* (2013.01); *B29C 45/0408* (2013.01); *B29C 45/0441* (2013.01); *B29C 45/2681* (2013.01); *B29L 2031/50* (2013.01)

(58) Field of Classification Search
CPC ..... B29C 45/04; B29C 45/2681; B29C 45/34; B29C 33/10; B29C 33/304; B29C 33/76; B29C 33/485; B29C 33/442; B29C 33/44
See application file for complete search history.

(56) References Cited

U.S. PATENT DOCUMENTS

| | | | |
|---|---|---|---|
| 1,432,469 A * | 10/1922 | Klein | B29D 35/02 |
| | | | 425/395 |
| 3,752,437 A | 8/1973 | Saidla | |
| 6,439,536 B1 | 8/2002 | Piccolo | |

(Continued)

FOREIGN PATENT DOCUMENTS

| | | |
|---|---|---|
| CN | 104960157 A | 10/2015 |
| CN | 105026135 B | 6/2017 |

(Continued)

OTHER PUBLICATIONS

CN111775416 machine translation (Year: 2020).*
Office Action and search report from the Taiwan Intellectual Property Office of TW patent application No. 111142508 dated Apr. 7, 2023.

(Continued)

*Primary Examiner* — S. Behrooz Ghorishi
*Assistant Examiner* — Alexander A Wang
(74) *Attorney, Agent, or Firm* — WPAT, PC; Anthony King

(57) ABSTRACT

A molding device includes a mold cavity defined by an upper mold, a lower mold and a middle mold being moveably attached to the lower mold; a position control mechanism configured to move the middle mold; and a gas discharging mechanism disposed adjacent to the mold cavity and including a gas conduit and a slit jointly defined by the upper mold and the lower mold when the molding device is closed, the slit is in communication with the mold cavity and the gas conduit. A molding method includes injecting a material into a mold cavity to form an article in the mold cavity; discharging at least a portion of a gas out of the mold cavity through a slit of a gas discharging mechanism adjacent to the mold cavity after the article is formed; disengaging a upper mold from a lower mold; and detaching the article from a middle mold.

10 Claims, 33 Drawing Sheets

(56) References Cited

U.S. PATENT DOCUMENTS

2016/0185022 A1\* 6/2016 Uchi .................. B29C 45/4471
264/318
2019/0389100 A1\* 12/2019 Lin ...................... B29C 44/588

FOREIGN PATENT DOCUMENTS

| CN | 109514821 | A | | 3/2019 |
|---|---|---|---|---|
| CN | 209176025 | U | | 7/2019 |
| CN | 209191194 | U | | 8/2019 |
| CN | 111775416 | | \* | 10/2020 |
| CN | 211868603 | U | | 11/2020 |
| CN | 215703732 | U | | 2/2022 |
| JP | 2000326377 | A | | 11/2000 |
| JP | 2017209904 | A | | 11/2017 |
| TW | 404339 | U | | 9/2000 |
| TW | 202000427 | A | | 1/2020 |
| TW | M612519 | U | | 6/2021 |
| TW | 202138158 | A | | 10/2021 |
| TW | M626308 | U | | 5/2022 |
| WO | 03/035357 | A1 | | 5/2003 |

OTHER PUBLICATIONS

Office Action and search report from the Taiwan Intellectual Property Office of TW patent application No. 110141653 dated Jun. 8, 2022.
Office Action from the Taiwan Intellectual Property Office of TW patent application No. 110141653 dated Oct. 26, 2022.
Rejection Decision from the Taiwan Intellectual Property Office of TW patent application No. 110141653 dated Jan. 5, 2023.
Office Action from the Japan Intellectual Property Office of JP patent application No. 2021-199507 dated Jan. 4, 2023.
Office Action and search report from the Taiwan Intellectual Property Office of TW patent application No. 112110123 dated Oct. 4, 2023.
Office Action from the Japan Intellectual Property Office of JP patent application No. 2023-016019 dated Sep. 26, 2023.
Final Office Action and search report from the Taiwan Intellectual Property Office of TW patent application No. 112110123 dated Dec. 20, 2023.
Extended European Search Report dated Dec. 5, 2023 issued by the European Patent Office for the EP Counterpart Application No. 23162665.6.

\* cited by examiner

```
100
```

| Providing a lower mold and a middle mold moveably attached to the lower mold | ~101 |

| Engaging an upper mold with the lower mold to define an accommodating space and dispose the middle mold within the accommodating space, wherein the upper mold, the middle mold and the lower mold jointly define a first mold cavity | ~102 |

| Disposing the upper mold, the middle mold and the lower mold over a platform including a first opening extending through the platform | ~103 |

| Disposing a plunger under the lower mold and the platform, wherein the plunger includes a base and a rod extendable toward the lower mold and retractable toward the base | ~104 |

| Injecting a molding material into the first mold cavity and at least partially surrounding the middle mold to form an article in the first mold cavity | ~105 |

| Applying a plunging force to the lower mold and the upper mold by extending the rod through the first opening towards the upper mold during the injection of the molding material into the first mold cavity | ~106 |

| After or during the formation of the article in the first mold cavity, discharging at least a portion of a gas out of the first mold cavity through a slit of a gas discharging mechanism adjacent to the first mold cavity | ~107 |

| Disengaging the upper mold from the lower mold | ~108 |

| Lifting the middle mold and the article from the lower mold before tilting the middle mold, wherein the article is held by the middle mold | ~109 |

| Tilting the middle mold and the article relative to the lower mold | ~110 |

| After tilting the middle mold, detaching the article from the middle mold | ~111 |

FIG. 1

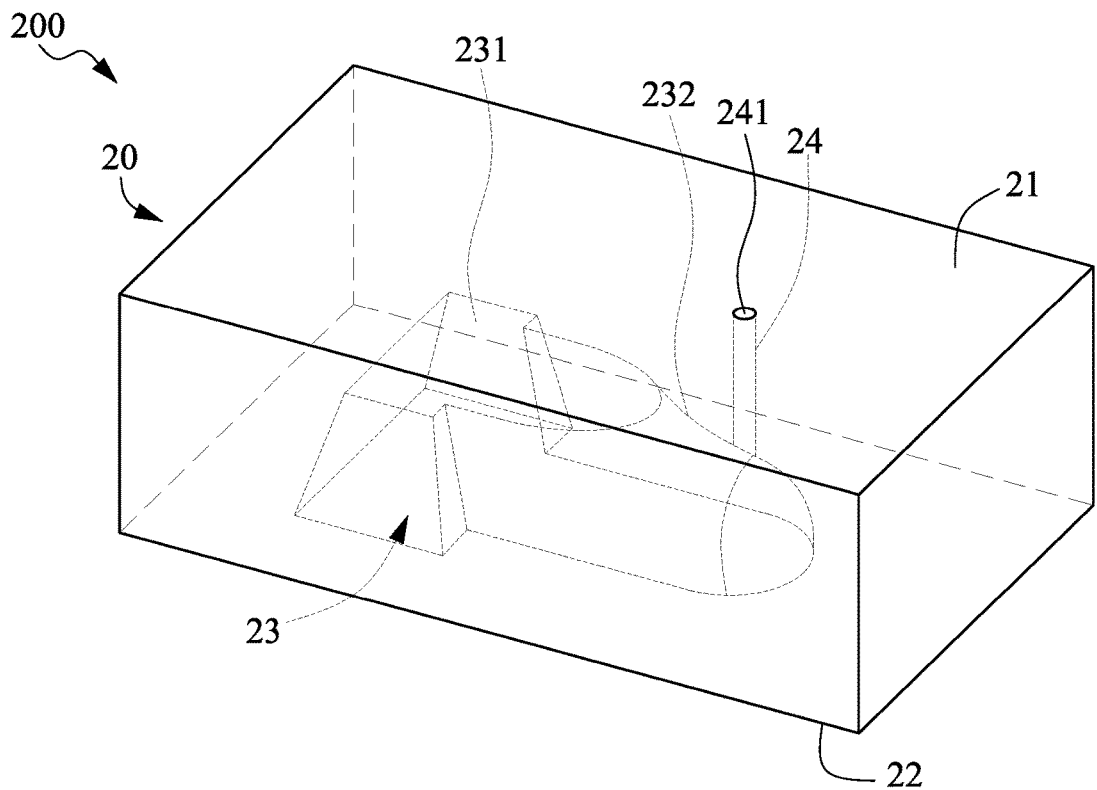
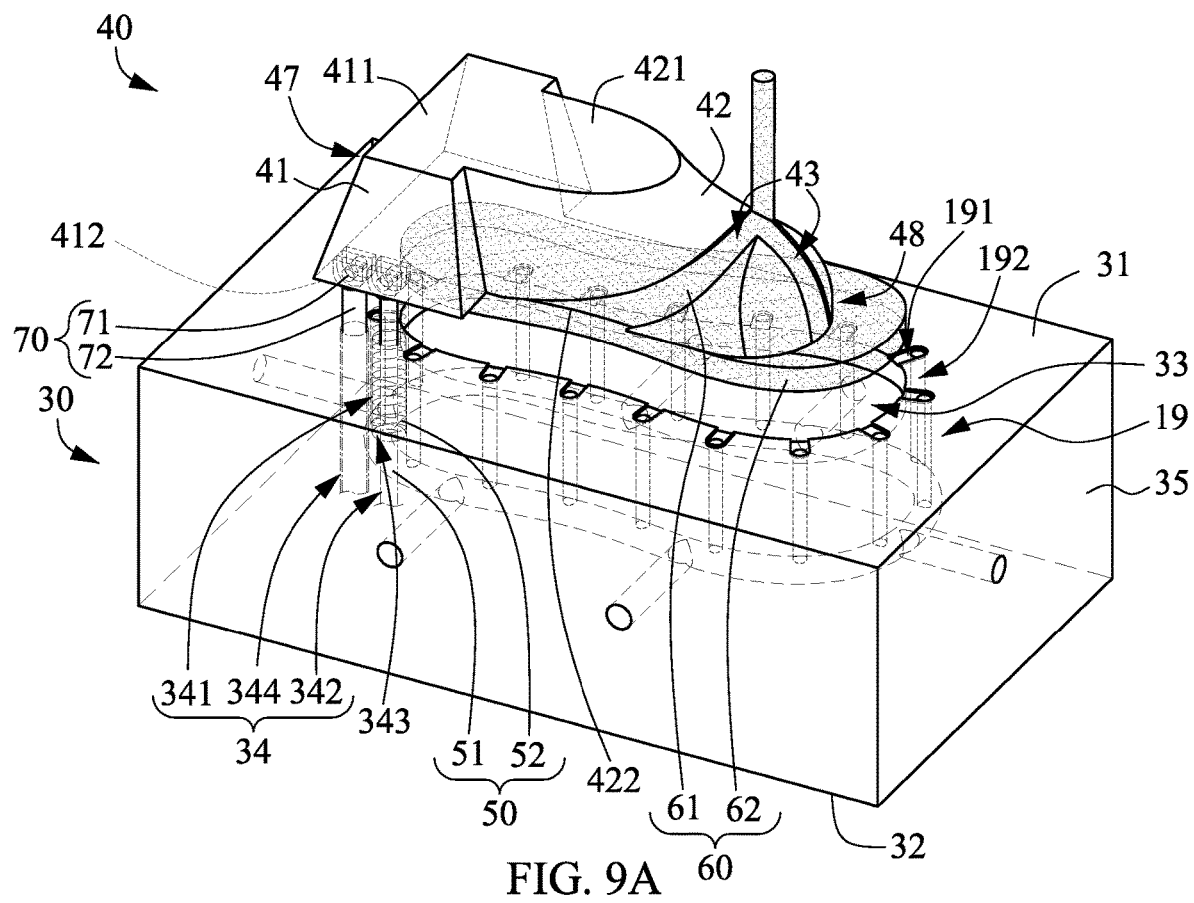
FIG. 9A

MOLDING DEVICE AND MOLDING METHOD

TECHNICAL FIELD

The present invention is related to a molding device and a molding method thereof; in particular, to a molding device and a molding method thereof suitable for use in injection molding or extrusion molding.

BACKGROUND

Foamed polymer articles have many advantages, such as high strength, light weight, impact resistance, good sound insulation and thermal insulation, etc. The foamed polymer article can be made into a molded article having a predetermined shape by injection molding or extrusion molding. For example, after a polymeric material is melted and mixed with a blowing agent in an extruding system to form a mixture, the mixture is injected or extruded into a molding device to form the desired foamed polymer article. The properties and applications of foamed polymer articles can be altered by changing the composition of the mixture and adjusting the molding method.

BRIEF SUMMARY OF THE INVENTION

One purpose of the present invention is to provide a molding device and a molding method.

According to one embodiment of the present disclosure, a molding device is disclosed. The molding device includes an upper mold, a lower mold disposed opposite to the upper mold and a middle mold disposed between the upper mold and the lower mold, and being moveably attached to the lower mold. The molding device further includes a position control mechanism attached to the middle mold and configured to move the middle mold relative to the upper mold and the lower mold, and a gas discharging mechanism disposed adjacent to a mold cavity defined by the upper mold, the middle mold and the lower mold. The gas discharging mechanism includes a gas conduit and a slit communicable with the mold cavity and the gas conduit and jointly defined by the upper mold and the lower mold when the molding device is in a closed configuration.

According to one embodiment of the present disclosure, a molding method is disclosed. The molding method includes: providing a lower mold and a middle mold moveably attached to the lower mold; engaging an upper mold with the lower mold to define an accommodating space and dispose the middle mold within the accommodating space, wherein the upper mold, the middle mold and the lower mold jointly define a first mold cavity; injecting a molding material into the first mold cavity and at least partially surrounding the middle mold to form an article in the first mold cavity. The method further includes after or during the formation of the article in the first mold cavity, discharging at least a portion of a gas out of the first mold cavity through a slit of a gas discharging mechanism adjacent to the first mold cavity; disengaging the upper mold from the lower mold; and detaching the article from the middle mold.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 1 is a flowchart illustrating a molding method according to one embodiment of the present invention.

FIG. 9A is a schematic perspective view of a molding device at one or more manufacturing stages of a molding method according to some embodiments of the present invention.

DETAILED DESCRIPTION

Figure 2A:
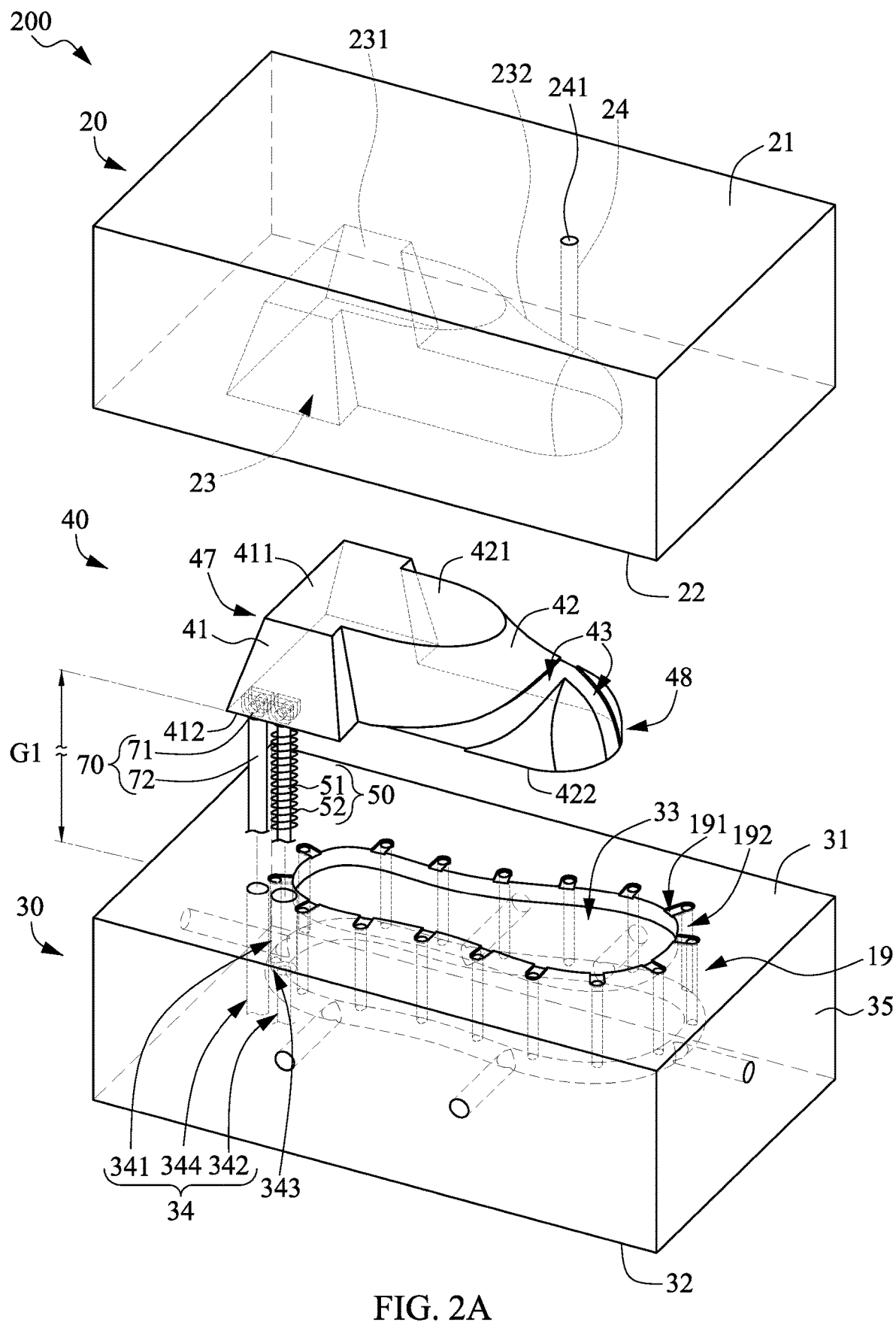
FIG. 2A is a schematic perspective view of a molding device at one or more manufacturing stages of a molding method according to some embodiments of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

In general, the appearance and physical properties of the foamed polymer articles are directly affected by the forming process, and hence, the design of the mold must consider the gas discharging after the injection of the mixture into the mold cavity so that the mixture can be distributed in the mold cavity uniformly and rapidly and distribution density of bubble pores in the mixture is high and uniform so as to retain the original physical property.

FIG. 1 is a flowchart showing a molding method 100 in accordance with some embodiments of the present disclosure. In some embodiments, the method 100 is for manufacturing the article 60 shown in FIG. 12. In order to illustrate concepts and the method 100 of the present disclosure, various embodiments are provided below. However, the present disclosure is not intended to be limited to specific embodiments. In addition, elements, conditions or parameters illustrated in different embodiments can be combined or modified to form different combinations of embodiments as long as the elements, parameters or conditions used are not in conflict. Further, additional steps can be provided before, during, and after the steps shown in FIG. 1, and some of the steps described below can be replaced or eliminated in other embodiments of the method 100. The order of the steps may be interchangeable. For ease of illustration, reference numerals with similar or same functions and properties are repeated in different embodiments and FIGS. 2 to 12 are schematic views illustrating exemplary operations for the molding method, e.g., illustrated in FIG. 1, according to one embodiment of the present disclosure.

Figure 2B:
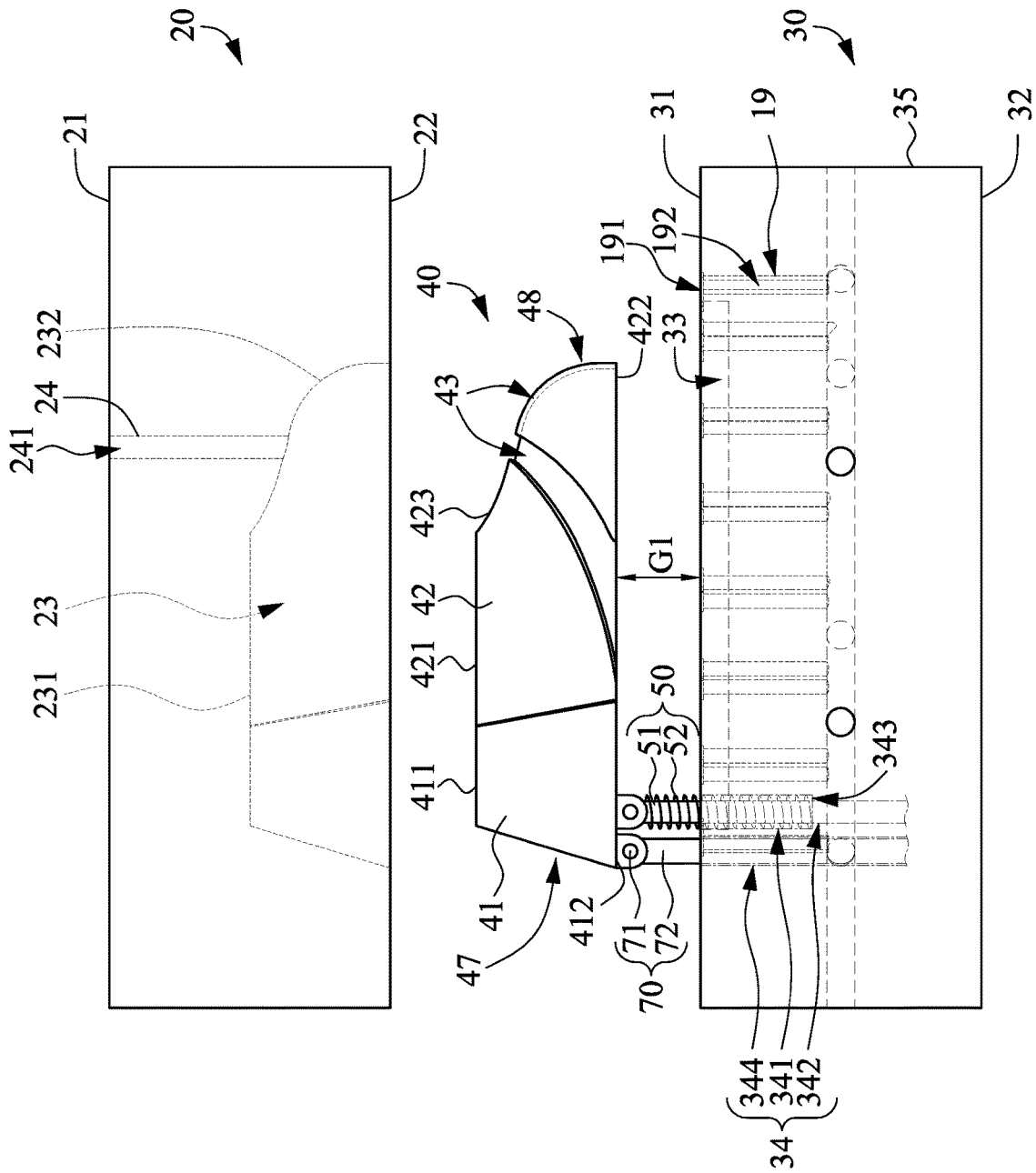
FIG. 2B is a side view of the molding device of FIG. 2A.

FIG. 2A is a schematic perspective view of a molding device 200 at operation 101 of the molding method 100 according to some embodiments of the present invention. FIG. 2B is a side view of the molding device 200 of FIG. 2A. In some embodiments, the molding device 200 is provided. In some embodiments, the molding device 200 includes an upper mold 20, a lower mold 30, a middle mold 40, a position control mechanism 50, a tilt mechanism 70, and a gas discharging mechanism 19. Referring to FIGS. 2A and 2B, in some embodiments, in operation 101, the lower mold 30 and the middle mold 40 moveably attached to the lower mold 30 are provided.

In some embodiments, the upper mold 20 is disposed opposite to the lower mold 30. The upper mold 20 may be placed on and engaged with the lower mold 30. In some embodiments, the upper mold 20 and the lower mold 30 are complementary with and separable from each other. The upper mold 20 may correspond to the lower mold 30 in some configurations such as dimension, shape or the like. In some embodiments, the upper mold 20 and the lower mold 30 are complementary with each other in order to define a first mold cavity 14 shown in FIGS. 4A and 4B. In some embodiments, the upper mold 20 and the lower mold 30 are separated from each other during operation 101. In the embodiment illustrated in FIG. 2A and FIG. 2B, the molding device 200 is in an open configuration.

In some embodiments, the provision of the molding device 200 includes conveying the lower mold 30 towards the upper mold 20. As such, the lower mold 30 would be disposed under the upper mold 20 for subsequent steps. In some embodiments, the upper mold 20 is aligned with the lower mold 30.

Referring to FIGS. 2A and 2B, in some embodiments, the upper mold 20 has a top surface 21 and a bottom surface 22 opposite to the top surface 21. In some embodiments, the upper mold 20 defines an upper mold cavity 23 and a feeding port 24. In some embodiments, the bottom surface 22 of the upper mold 20 faces the lower mold 30 and the middle mold 40. In some embodiments, the upper mold cavity 23 of the upper mold 20 is indented from the bottom surface 22 of the upper mold 20. A configuration (e.g., dimension or shape) of the upper mold cavity 23 of the upper mold 20 may correspond to a configuration (e.g., dimension or shape) of the middle mold 40. In some embodiments, the upper mold cavity 23 of the upper mold 20 includes a first inner surface 231 and a second inner surface 232. In some embodiments, the second inner surface 232 extends between the first inner surface 231 and the bottom surface 22 of the upper mold 20. In some embodiments, the first inner surface 231 and the second inner surface 232 are conformal with the middle mold 40.

Figure 4A:
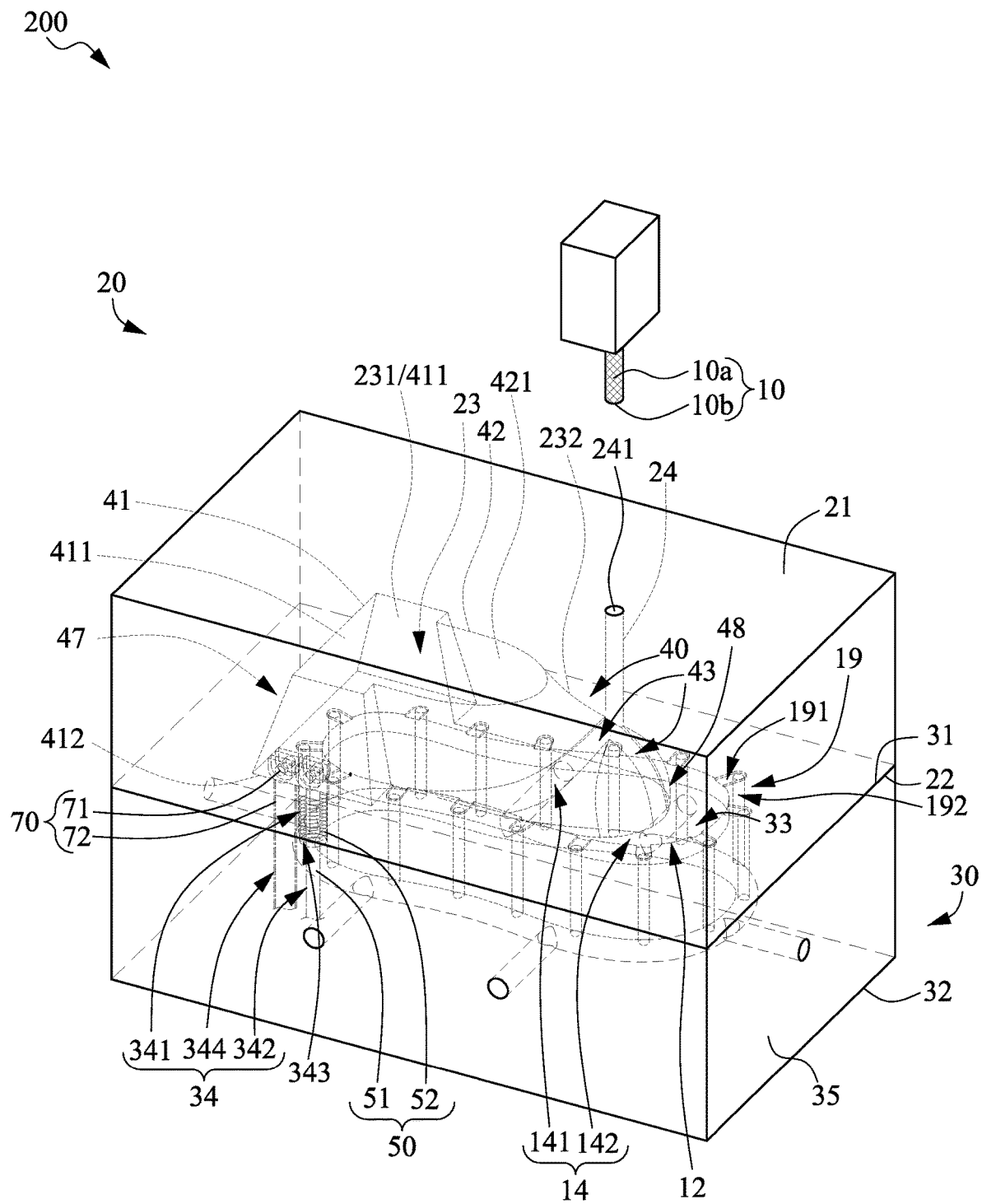
FIG. 4A is a schematic perspective view of a molding device at one or more manufacturing stages of a molding method according to some embodiments of the present invention.
Figure 4B:
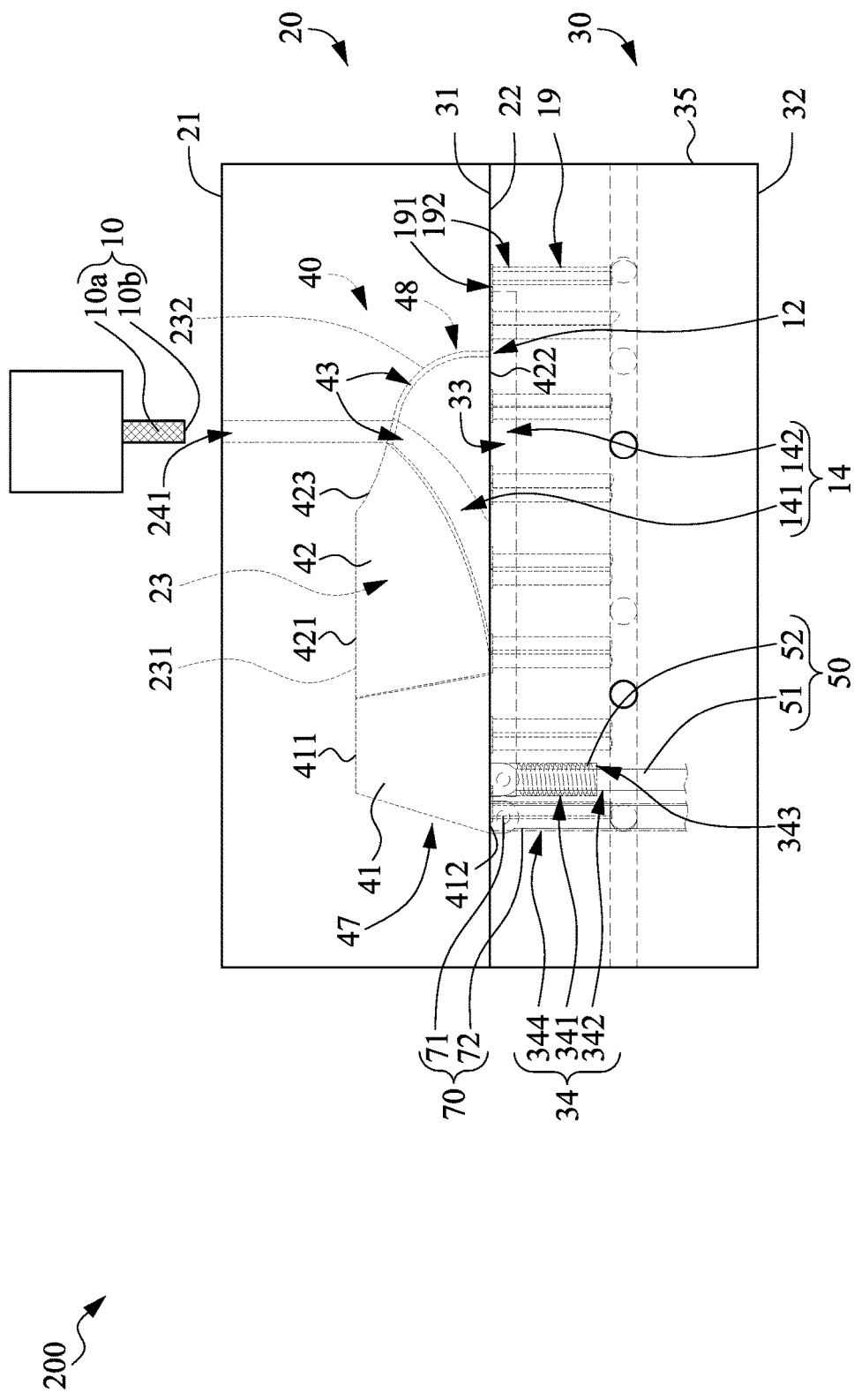
FIG. 4B is a side view of the molding device of FIG. 4A.

In some embodiments, the feeding port 24 extends through the upper mold 20. The feeding port 24 has an opening 241 disposed on the top surface 21 of the upper mold 20. In some embodiments, the feeding port 24 is in communication with the upper mold cavity 23 of the upper mold 20 or the first mold cavity 14 when the molding device 200 is in the closed configuration as shown in FIG. 4A and FIG. 4B. Alternatively, in some embodiments, the upper mold cavity 23 of the upper mold 20 is accessible through the feeding port 24. For simplicity and clarity, only one feeding port 24 is illustrated, however, it can be understood that any suitable numbers of the feeding port 24 can be configured at the upper mold 20. In some embodiments, the number of the feeding port 24 is identical to the number of the upper mold cavity 23 of the upper mold 20. In some embodiments, the number of the upper mold cavity 23 of the upper mold 20 is more than the number of the feeding port 24. In some embodiments, the number of the feeding port 24 is more than the number of the upper mold cavity 23 of the upper mold 20.

In some embodiments, instead of configuring the feeding port 24 at the upper mold 20, the feeding port 24 is disposed at the lower mold 30 for accessing a lower mold cavity 33 of the lower mold 30 or the first mold cavity 14 when the molding device 200 is in the closed configuration as shown in FIG. 4A and FIG. 4B. In some embodiments, the feeding port 24 is configured at a sidewall 35 of the lower mold 30, a bottom surface 32 of the lower mold 30, or any other suitable positions as long as the feeding port 24 is communication with the first mold cavity 14 when the molding device 1 is in the closed configuration as shown in FIG. 4A and FIG. 4B.

Referring to FIGS. 2A and 2B, in some embodiments, the lower mold 30 is disposed under the upper mold 20. The lower mold 30 includes a top surface 31 and a bottom surface 32 opposite to the top surface 31, and defines a lower mold cavity 33 and a hole structure 34. In some embodiments, the top surface 31 of the lower mold 30 faces the upper mold 20 and the middle mold 40. The lower mold cavity 33 of the lower mold 30 is recessed from the top surface 31 of the lower mold 30. A configuration (e.g., dimension or shape) of the lower mold cavity 33 of the lower mold 30 corresponds to a configuration (e.g., dimension or shape) of a bottom surface of the middle mold 40. In some embodiments, the lower mold cavity 33 of the lower mold 30 is disposed right under the middle mold 40. The lower mold cavity 33 of the lower mold 30 may be a portion of the first mold cavity 14 when the molding device 200 is in the closed configuration as shown in FIG. 4A and FIG. 4B.

Referring to FIGS. 2A and 2B, in some embodiments, the hole structure 34 is disposed within the lower mold 30 and adjacent to the lower mold cavity 33 of the lower mold 30. Thus, the hole structure 34 may not be in communication with the lower mold cavity 33 of the lower mold 30. In some embodiments, the lower mold cavity 33 of the lower mold 30 may not be accessible through the hole structure 34. In some embodiments, the hole structure 34 may or may not extend through the lower mold 30.

In some embodiments, the hole structure 34 includes a first hole 341 and a second hole 342 in communication with each other. The first hole 341 includes an opening on the top surface 31 of the lower mold 30. The second hole 342 is disposed under the first hole 341. In some embodiments, a size (e.g., width or diameter) of the second hole 342 is smaller than a size (e.g., width or diameter) of the first hole 341, so as to form a step structure 343. In some embodiments, the size of the second hole 342 is smaller than the size of the first hole 341. In some embodiments, the hole structure 34 further includes a third hole 344 disposed adjacent to the first hole 341 and the second hole 342. The third hole 344 may not be in communication with the first hole 341 and the second hole 342.

For simplicity and clarity, only the first hole 341, the second hole 342 and the third hole 344 are illustrated, however, it can be understood that any suitable numbers of the holes can be configured at the lower mold 30. In some embodiments, the hole structure 34 may be used for accommodating at a portion of the position control mechanism 50 and at least a portion of the tilt mechanism 70. Thus, the number of the holes may be equal to the number of the position control mechanism 50 and the number of the tilt mechanism 70. The number of the position control mechanism 50 may be two or three, which can balance or uniformly support a downward press force applied on the position control mechanism 50 and the middle mold 40 from the upper mold 20.

In some embodiments, a gas discharging mechanism 19 is disposed adjacent to the first mold cavity 14. In some embodiments, the gas discharging mechanism 19 is disposed within the upper mold 20 or the lower mold 30. In some embodiments, the gas discharging mechanism 19 includes a gas conduit 192 disposed adjacent to the lower mold cavity 33 and extending within the lower mold 30, and a slit 191 jointly defined by the upper mold 20 and the lower mold 30 when the molding device 200 is in the closed configuration as shown in FIG. 4A and FIG. 4B, and the slit 191 is in communication with the first mold cavity 14 and the gas conduit 192. In some embodiments, the slit 191 is disposed between the gas conduit 192 and the lower mold cavity 33. One end of the slit 191 is coupled to the lower mold cavity 33, and the other end thereof is coupled to the gas conduit 192. In some embodiments, the slit 191 is indented from the top surface 31 of the lower mold 30. In some embodiments, a height of the slit 191 is less than a diameter of the gas conduit 192. In some embodiments, the height of the slit 191 is greater than 0.01 mm but less than 0.5 mm. In some embodiments, the height of the slit 191 is greater than 0.01 mm but less than 0.2 mm. In some embodiments, a width of the slit 191 ranges between 3 mm and 20 mm. In some embodiments, the size and shape of the slit 191 are in configurations that only gas or fluid are allowed to flow into the slit 191, while solids and liquids cannot enter the slit 191.

In some embodiments, one end of the gas conduit 192 is in communication with the slit 191, and the other end thereof includes an opening formed on the lower mold 30 and in communication with the external environment. In some embodiments, the gas conduit 192 is arranged between the lower mold cavity 33 and a sidewall 35 of the lower mold 30 or between the lower mold cavity 33 and the bottom surface 32 of the lower mold 30.

In some embodiments, the gas discharging mechanism 19 includes a plurality of the gas conduits 192 surrounding the lower mold cavity 33 and spaced apart from each other, and a plurality of the gas slits 191 in communication with the lower mold cavity 33 and the corresponding gas conduit 192. The number and location of the plurality of gas conduits 192 are not particularly limited; for example, they can be arranged between the lower mold cavity 33 and a sidewall 35 of the lower mold 30 and/or between the lower mold cavity 33 and the bottom surface 32 of the lower mold 30; however, the present invention is not limited thereto.

In some embodiments, the middle mold 40 is disposed between the upper mold 20 and the lower mold 30, and being moveably attached to the lower mold 30. In some embodiments, the middle mold 40 is moveably attached to the lower mold 30 and is moveable between the upper mold 20 and the lower mold 30 due to the operation of the position control mechanism 50 and/or the tilt mechanism 70.

In some embodiments, the position control mechanism 50 drives or actuates the middle mold 40 to move between the upper mold 20 and the lower mold 30. It can be understood that a maximum displacement of the middle mold 40 is limited by the position control mechanism 50. In some embodiments, a gap G1 or distance between the middle mold 40 and the lower mold 30 is controlled by the position control mechanism 50.

In some embodiments, the middle mold 40 may include a main portion 41 and a shoe last 42. In some embodiments, the main portion 41 is connected to a back end of the shoe last 42. In some embodiments, the main portion 41 and the shoe last 42 may be formed integrally as a monolithic structure. In some embodiments, the main portion 41 has a top surface 411 and a bottom surface 412 opposite to the top surface 411. In some embodiments, the shoe last 42 has a top surface 421, a bottom surface 422 opposite to the top surface 421, and an outer surface 423 extending between the top surface 421 and the bottom surface 422. In some embodiments, the shoe last 42 defines at least one recess 43 recessed from the outer surface 423. In some embodiments, the recess 43 of the middle mold 40 is a portion of the first mold cavity 14 when the molding device 200 is in the closed configuration as shown in FIG. 4A and FIG. 4B. In some embodiments, a plurality of recesses 43 are in communication with each other and extending to the bottom surface 422 of the shoe last 42. In some embodiments, the shoe last 42 further defines at least one bottom recess (not shown) recessed from the bottom surface 422 of the shoe last 42. In some embodiments, the middle mold 40 includes a first end 47 close to the main portion 41 and away from the shoe last 42, and a second end 48 opposite to the first end 47. The second end 48 of the middle mold 40 is close to the shoe last 42 and away from the main portion 41. In some embodiments, the second end 48 of the middle mold 40 includes the shoe last 42.

In some embodiments, the top surface 421 of the shoe last 42 is substantially aligned with or coplanar with the top surface 411 of the main portion 41. In some embodiments, a top surface of the middle mold 40 includes the top surface 421 of the shoe last 42 and the top surface 411 of the main portion 41. Similarly, in some embodiments, the bottom surface 422 of the shoe last 42 is substantially aligned with or coplanar with the bottom surface 412 of the main portion 41. In some embodiments, a bottom surface of the middle mold 4 may include the bottom surface 422 of the shoe last 42 and the bottom surface 412 of the main portion 41. As a result, in some embodiments, a maximum thickness of the shoe last 42 may be substantially equal to a maximum thickness of the main portion 41 and a maximum thickness of the middle mold 40.

In some embodiments, the position control mechanism 50 connects or attaches to the bottom surface 412 of the main portion 41 of the middle mold 40. In some embodiments, the position control mechanism 50 is configured to drive or actuate the middle mold 40 to move upward so as to generate the gap G1 between the top surface 31 of the lower mold 30 and the bottom surface 412 of the main portion 41 of the middle mold 40 when the molding device 200 is in an open configuration. In some embodiments, the position control mechanism 50 is configured to generate a relative movement between the middle mold 40 and the lower mold 30. As shown in FIG. 2A and FIG. 2B, the molding device 200 is in an open configuration, and the gap G1 reaches its maximum value. In some embodiments, the gap G1 ranges between 45 mm and 150 mm.

In some embodiments, a portion of the position control mechanism 50 is accommodated in the hole structure 34 of the lower mold 30. In some embodiments, a portion of the position control mechanism 50 is accommodated in the first hole 341 and the second hole 342 of the lower mold 30. In some embodiments, when the molding device 200 is in the closed configuration, the whole position control mechanism 50 is accommodated in the hole structure 34 of the lower mold 30, and the bottom surface 412 of the main portion 41 contacts the top surface 31 of the lower mold 30.

In some embodiments, the position control mechanism 50 includes a bar member 51 and a biasing member 52. The bar member 51 may be a pin, a pillar, a post or a column, and may be used for guiding the moving direction of the middle mold 40. In some embodiments, an upper end of the bar member 51 connects or attaches to the bottom surface 412 of the main portion 41 of the middle mold 40, and a lower end of the bar member 51 extends through the first hole 341 and the second hole 342 of the hole structure 34. The biasing member 52 is configured to control a movement of the bar member 51 or driving the bar member 51. The biasing member 52 may be a spring or an elastic body that surrounds the bar member 51. In some embodiments, an upper end of the biasing member 52 connects or attaches to the bottom surface 412 of the main portion 41 of the middle mold 40, and a lower end of the biasing member 52 connects or attaches to the step structure 343 of the hole structure 34 of the lower mold 30. When a downward force is applied on the middle mold 40 to drive the middle mold 40 to move downward to press the biasing member 52, an elastic potential energy is stored in the pressed biasing member 52. Once the downward force is released, the elastic potential energy will push the middle mold 40 to move upward. It can be understood that the position control mechanism 50 may be a piston or other suitable mechanism that has a compression phase and a springback phase. In some embodiments, the biasing member 52 is omitted, and the lower end of the bar member 51 connects to a suitable actuator. Thus, the movement of the bar member 51 may not controlled by the elastic potential energy.

In some embodiments, the middle mold 40 is detachable from the lower mold 30 and the position control mechanism 50. It can be understood that the size or appearance of the article 60 (as show in FIG. 12) may correspond to the size or appearance of the middle mold 40. Thus, in order to manufacture different articles 60 having different sizes or different appearances, different middle mold 40 having different sizes or different appearances may be adopted into the molding device 200. When the middle mold 40 is changed, the lower mold cavity 33 of the lower mold 30 and the upper mold cavity 23 of the upper mold 20 may be changed accordingly.

Figure 10:
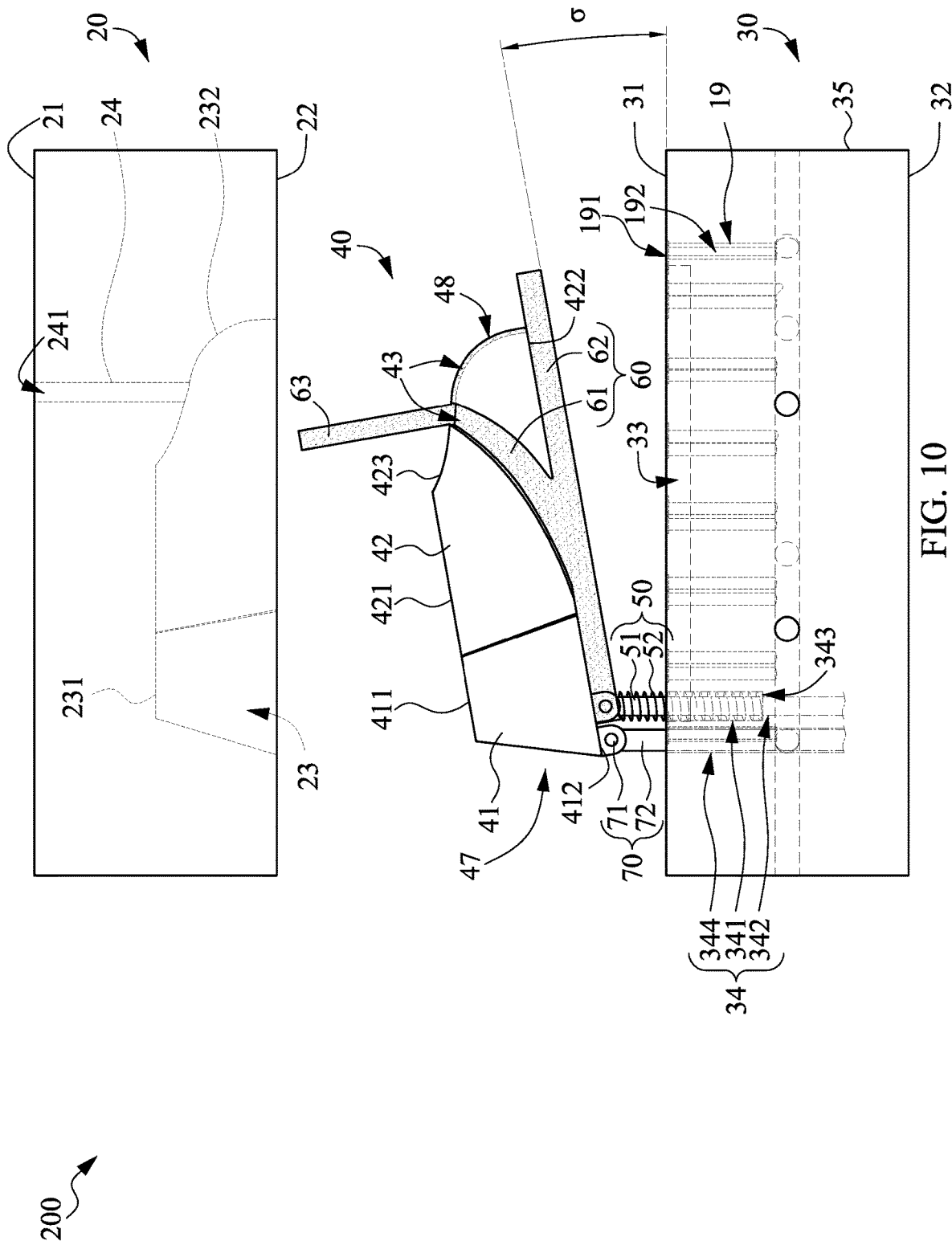
FIGS. 10 and 11 are side views of a molding device at one or more manufacturing stages of a molding method according to some embodiments of the present invention.

In some embodiments, the tilt mechanism 70 is attached to the middle mold 40 and configured to incline the middle mold 40 relative to the lower mold 30. In some embodiments, the tilt mechanism 70 is disposed adjacent to the position control mechanism 50. In some embodiments, the tilt mechanism 70 is attached to the first end 47 of the middle mold 40. In some embodiments, the tilt mechanism 70 connects or attaches to the bottom surface 412 of the main portion 41 of the middle mold 40. In some embodiments, the tilt mechanism 70 is configured to tilt the middle mold 40 relative to the lower mold 30 to move the second end 48 of the middle mold 40 higher than the first end 47 of the middle mold 40. The middle mold 40 may be tilted when the molding device 200 is in an open configuration; when the molding device 200 is in the closed configuration, the middle mold 40 cannot be tilted. The middle mold 40 may be tilted by the tilt mechanism 70 when the gap G1 between the middle mold 40 and the lower mold 30 is greater than or equal to zero. In some embodiments, before the middle mold 40 is tilted, the bottom surface 422 of the shoe last 42 is parallel to the top surface 31 of the lower mold 30. In some embodiments, the tilt mechanism 70 is configured to generate a relative tilt between the middle mold 40 and the lower mold 30. In some embodiments, when the middle mold 40 is tilted (as shown in FIG. 10), an angle σ is generated between the bottom surface 422 of the shoe last 42 and the top surface 31 of the lower mold 30. In some embodiments, the angle σ ranges between 0 and 90 degree. In some embodiments, the angle σ ranges between 20 and 70 degree.

In some embodiments, a portion of the tilt mechanism 70 is accommodated in the hole structure 34 of the lower mold 30. In some embodiments, a portion of the tilt mechanism 70 is accommodated in the third hole 344 of the lower mold 30. In some embodiments, when the molding device 200 is in the closed configuration, the whole tilt mechanism 70 is accommodated in the hole structure 34 of the lower mold 30.

In some embodiments, the tilt mechanism 70 includes a fulcrum 71 for pivoting the middle mold 40. The middle mold 40 can be rotated around the fulcrum 71 to tilt the middle mold 40 relative to the lower mold 30. In some embodiments, the fulcrum 71 attaches to a bar member 72 disposed in the third hole 344.

The bar member 72 may be a pin, a pillar, a post or a column, and may be used for moving the fulcrum 71 along with the middle mold 40. In some embodiments, the bar member 72 is disposed adjacent to the bar member 51 of the position control mechanism 50. In some embodiments, an upper end of the bar member 72 connects or attaches to the bottom surface 412 of the main portion 41 of the middle mold 40, and a lower end of the bar member 72 extends through the third hole 344 of the hole structure 34. When the position control mechanism 50 drives or actuates the middle mold 40 to move upward and the gap G1 is generated between the top surface 31 of the lower mold 30 and the bottom surface 412 of the main portion 41 of the middle mold 4, the fulcrum 71 and the bar member 72 of moves upwardly. In some embodiment, a position of the fulcrum 71 is controlled by the position control mechanism 50.

Figure 3A:
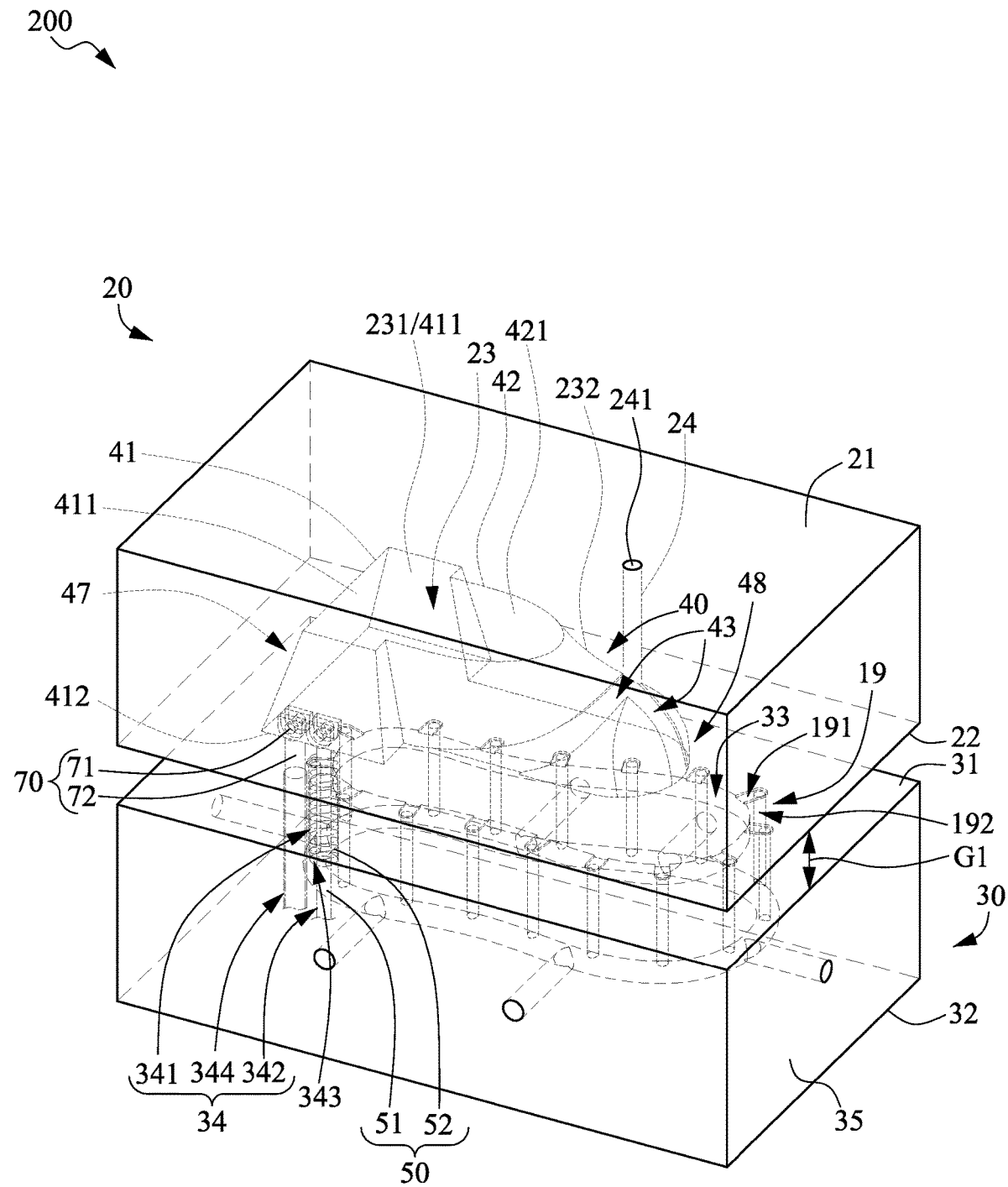
FIG. 3A is a schematic perspective view of a molding device at one or more manufacturing stages of a molding method according to some embodiments of the present invention.
Figure 3B:
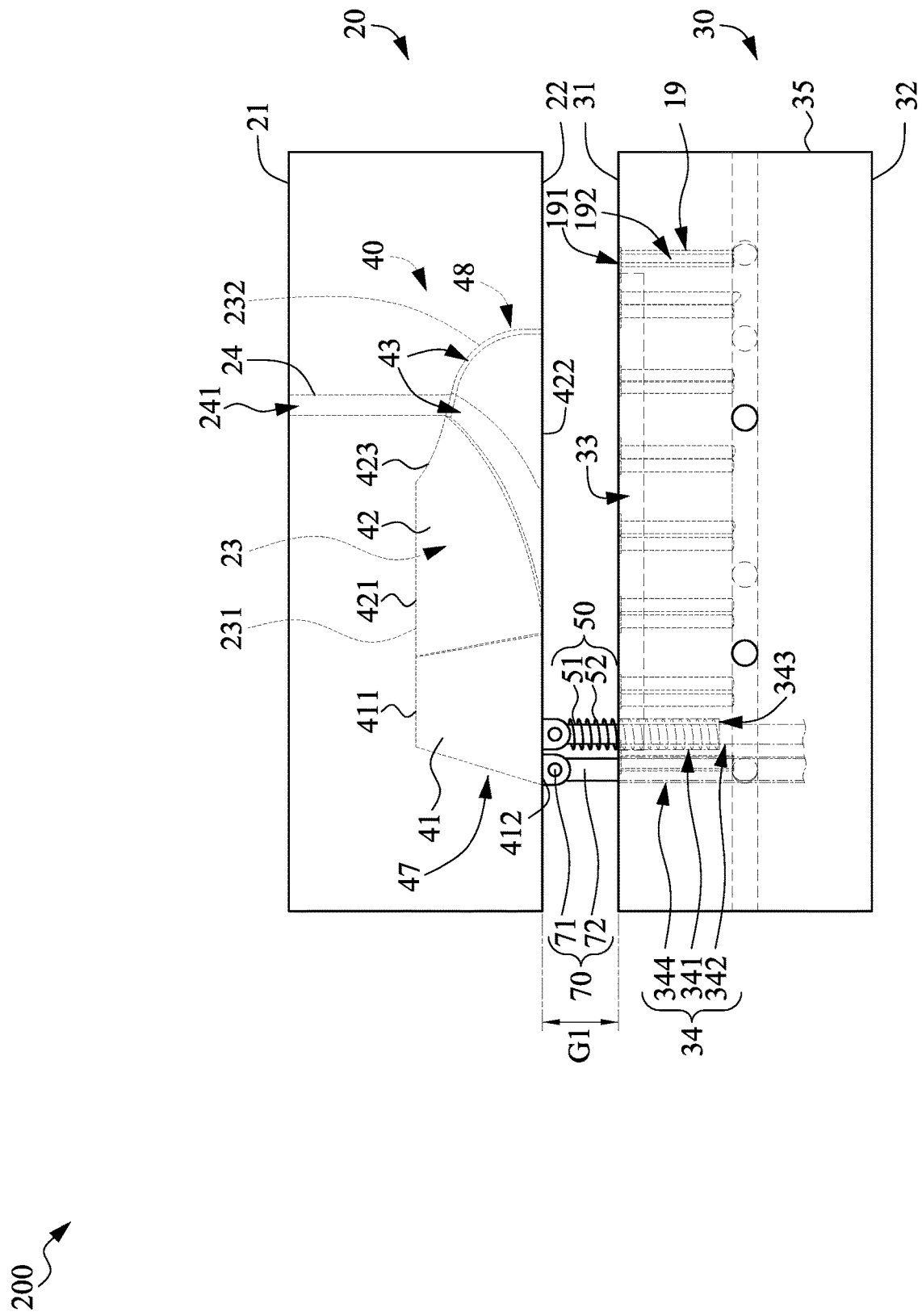
FIG. 3B is a side view of the molding device of FIG. 3A.

FIG. 3A is a schematic perspective view of a molding device 200 according to some embodiments of the present invention. FIG. 3B is a side view of the molding device 200 of FIG. 3A. Referring to FIGS. 3A and 3B, a distance between the upper mold 20 and the lower mold 30 is reduced gradually. As shown in FIGS. 3A and 3B, a relative movement between the upper mold 20 and the lower mold 30 occurs. In some embodiments, the position of the upper mold 23 is fixed, and the lower mold 30 and the middle mold 40 are moved together toward the upper mold 20. In some embodiments, the positions of the lower mold 30 and the middle mold 40 are fixed, and the upper mold 20 moves toward the lower mold 30 and the middle mold 40. In some embodiments, the lower mold 30 and the upper mold 20 are moved toward each other. At the stage illustrated in FIGS. 3A and 3B, the middle mold 40 is accommodated in the upper mold cavity 23 and not yet disposed in the lower mold cavity 33. That is, the middle mold 40 accommodates the upper mold 20 before the lower mold 30 accommodates the upper mold 20. In some embodiments, the first inner surface 231 of the upper mold 20 contacts the top surface of the middle mold 4 (including the top surface 421 of the shoe last 42 and the top surface 411 of the main portion 41) at the stage illustrated in FIGS. 3A and 3B. The second inner surface 232 of the upper mold 20 contacts the outer surface 423 of the middle mold 40. In some embodiments, the bottom surface of the middle mold 40 (including the bottom surface 422 of the shoe last 42 and the bottom surface 412 of the main portion 41) is substantially coplanar with the bottom surface 22 of the upper mold 20 at the stage illustrated in FIGS. 3A and 3B. Meanwhile, the gap G1 between the top surface 31 of the lower mold 30 and the bottom surface of the middle mold 40 has not changed. In some embodiments, at the stage illustrated in FIGS. 3A and 3B, the gap G1 reaches its maximum value.

FIG. 4A is a schematic perspective view of a molding device 200 at operation 102 of the molding method 100 according to some embodiments of the present invention. FIG. 4B is a side view of the molding device 200 of FIG. 4A. Referring to FIGS. 4A and 4B, in some embodiments, in operation 102, the upper mold 20 is engaged with the lower mold 30 to jointly define an accommodating space 12 and the middle mold 40 is disposed within the accommodating space 12. In some embodiments, the upper mold 20, the middle mold 40 and the lower mold 30 jointly define the first mold cavity 14. In some embodiments, the relative movement between the upper mold 20 and the lower mold 30 continues until the distance between the upper mold 20 and the lower mold 30 is reduced to zero. In some embodiments, the position of the upper mold 20 is fixed, the middle mold 40 accommodates in the upper mold 20, and the lower mold 30 moves toward the upper mold 20. In some embodiments, the position of the lower mold 30 is fixed, and the upper mold 20 and the middle mold 40 are moved together toward the lower mold 30. In some embodiments, the lower mold 30 and the upper mold 20 are moved toward each other. In some embodiments, the top surface 31 of the lower mold 30 is in contact with bottom surface of the middle mold 40. In some embodiments, the gap G1 between the top surface 31 of the lower mold 30 and the bottom surface of the middle mold 40 has reduced to zero. The upper mold 20 applies a downward force to the middle mold 40, and the middle mold 40 moves downwardly to press the biasing member 52. In some embodiments, an elastic potential energy is stored in the pressed biasing member 52 when the molding device 200 is in the closed configuration.

As shown in FIG. 4A and FIG. 4B, the molding device 200 is in a closed configuration, and the upper mold 20 is engaged with the lower mold 30. In some embodiments, the whole middle mold 40 is disposed and accommodated in the accommodating space 12. In some embodiments, the upper mold 20, the middle mold 40 and the lower mold 30 jointly defines a first mold cavity 14. The first mold cavity 14 is configured to accommodate a molding material (not shown) and to mold the molding material into the article 60 having predetermined shape. The feeding port 24 of the upper mold 20 is in communication with the first mold cavity 14.

In some embodiments, the method 100 further includes providing an extruding system 10 configured to produce the molding material, and providing a discharging channel 10a communicable with the extruding system 10 and including an outlet 10b disposed distal to the extruding system 10 and configured to discharge the molding material. In some embodiments, the feeding port 24 of the molding device 200 is correspondingly engageable with the outlet 10b. In some embodiments, the opening 241 of the feeding port 24 is engage with the discharging channel 10a. In some embodiments, the extruding system 10 and the discharging channel 10a are disposed adjacent to the feeding port 24 of the molding device 200. The molding device 200 is configured to receive the molding material from the outlet 10b of the discharging channel 10a. In some embodiments, the discharging channel 10a may be extended into and be retracted from the molding device 200. In some embodiments, the discharging channel 10a and the outlet 10b are overlapped with the feeding port 24 from a top view.

In some embodiments, the molding material includes a polymeric material such as ethylene vinyl acetate (EVA), styrene-ethylene-butylene-styrene (SEBS), thermoplastic polyurethanes (TPU), thermoplastic polyester elastomer (TPEE) or the like. In some embodiments, the molding material includes a recyclable material. In some embodiments, the molding material further includes a blowing agent. In some embodiments, the blowing agent can be any type of chemical or physical blowing agent known to those of ordinary skill in the art. In some embodiments, the blowing agent is a supercritical fluid. The supercritical fluid may include inert gas such as carbon dioxide or nitrogen in supercritical state. The technical details of mixing the polymeric material and the blowing agent are known in the prior art, and description thereof is omitted herein.

In some embodiments, as shown in FIG. 4A and FIG. 4B, the first mold cavity 14 includes a first portion 141 and a second portion 142 in communication with each other. In some embodiments, the first portion 141 defines by the second inner surface 232 of the upper mold 20 and the sidewalls of the recess 43 of the shoe last 42. In some embodiments, the first portion 141 of the first mold cavity 14 is substantially same as the recess 43 of the shoe last 42. In some embodiments, the second portion 142 defines by the sidewalls of the lower mold cavity 33 of the lower mold 30, the bottom surface of the middle mold 40 (including the bottom surface 422 of the shoe last 42 and the bottom surface 412 of the main portion 41) and the bottom surface 22 of the upper mold 20. In some embodiments, the second portion 142 of the first mold cavity 14 is substantially same as the lower mold cavity 33 of the lower mold 30.

Figure 5:
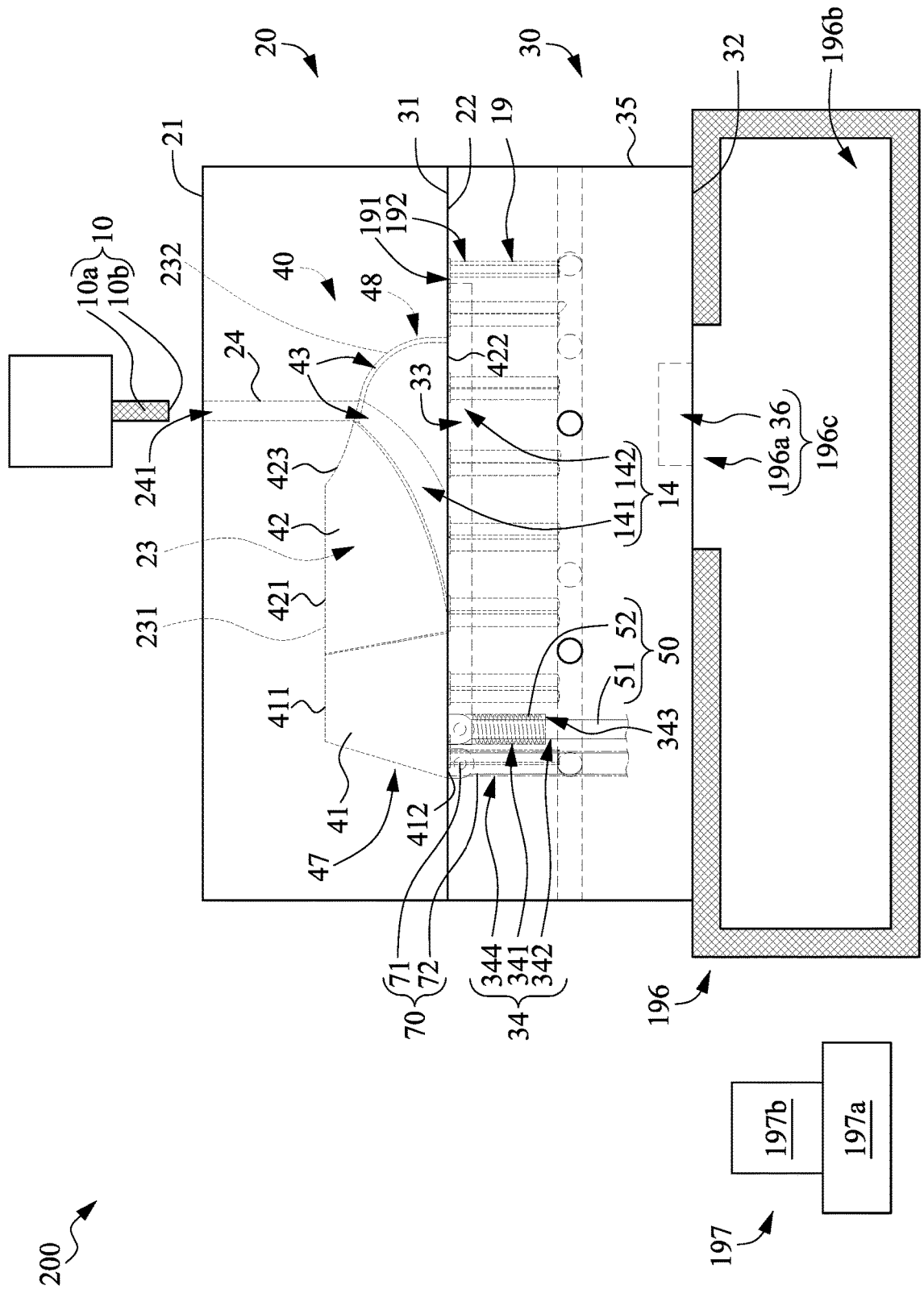
FIG. 5 is a side view of a molding device at one or more manufacturing stages of a molding method according to some embodiments of the present invention.

FIG. 5 is a side view of a molding device at operation 103 of the molding method 100 according to some embodiments of the present invention. In some embodiments, referring to FIG. 5, the method 100 further includes disposing the upper mold 20, the middle mold 40 and the lower mold 30 over a platform 196, wherein the platform 196 includes a first opening 196a extending through the platform 196. The platform 196 is configured to dispose the molding device 200.

In some embodiments, the extruding system 10 is disposed above the first opening 196a. In some embodiments, the discharging channel 10a and the outlet 10b are overlapped with the first opening 196a from a top view. In some embodiments, a chamber 196b is disposed under the platform 196. The platform 196 and the outlet 10b are disposed above the chamber 196b. In some embodiments, the molding device 200 is disposed between the extruding system 10 and the platform 196.

In some embodiments, a plunger 197 includes a base 197a and a rod 197b. The plunger 197 is configured to provide a plunging force to the molding device 200 disposed over the platform 196. In some embodiments, the plunger 197 is a hydraulic plunger. In some embodiments, the rod 197b is extendable through the first opening 196a toward the molding device 200 and retractable toward the base 197a. In some embodiments, the rod 197b is movable vertically. In some embodiments, the plunger 197 can provide the plunging force in a range of about 30N to 80N. In some embodiments, the plunging force is about 50N.

In some embodiments, the plunger 197 is movable relative to the platform 196. In some embodiments, the plunger 197 is separated from the chamber 196b, and may be moved into the chamber 196b. In some embodiments, the plunger 197 is not movable and is initially fixed in the chamber 196b. In some embodiments, the plunger 197 is fixedly disposed under the platform 196, and the rod 197b is vertically aligned with the first opening 196a. In some embodiments, the plunger 197 is initially fixed in the chamber 196b. In some embodiments, the plunger 197 is in a retracted configuration as shown in FIG. 5.

In some embodiments, the lower mold 30 further includes a second opening 36 configured to receive at least a portion of the plunger 197. In some embodiments, the second opening 36 is overlapped with the first opening 196a from a top view. In some embodiments, a passage 196c including the first opening 196a and the second opening 36 is formed after placing the molding device 200 on the platform 196. In some embodiments, the passage 196c extends through the platform 196. In some embodiments, the feeding port 24 is overlapped with the passage 196c from a top view.

Figure 6A:
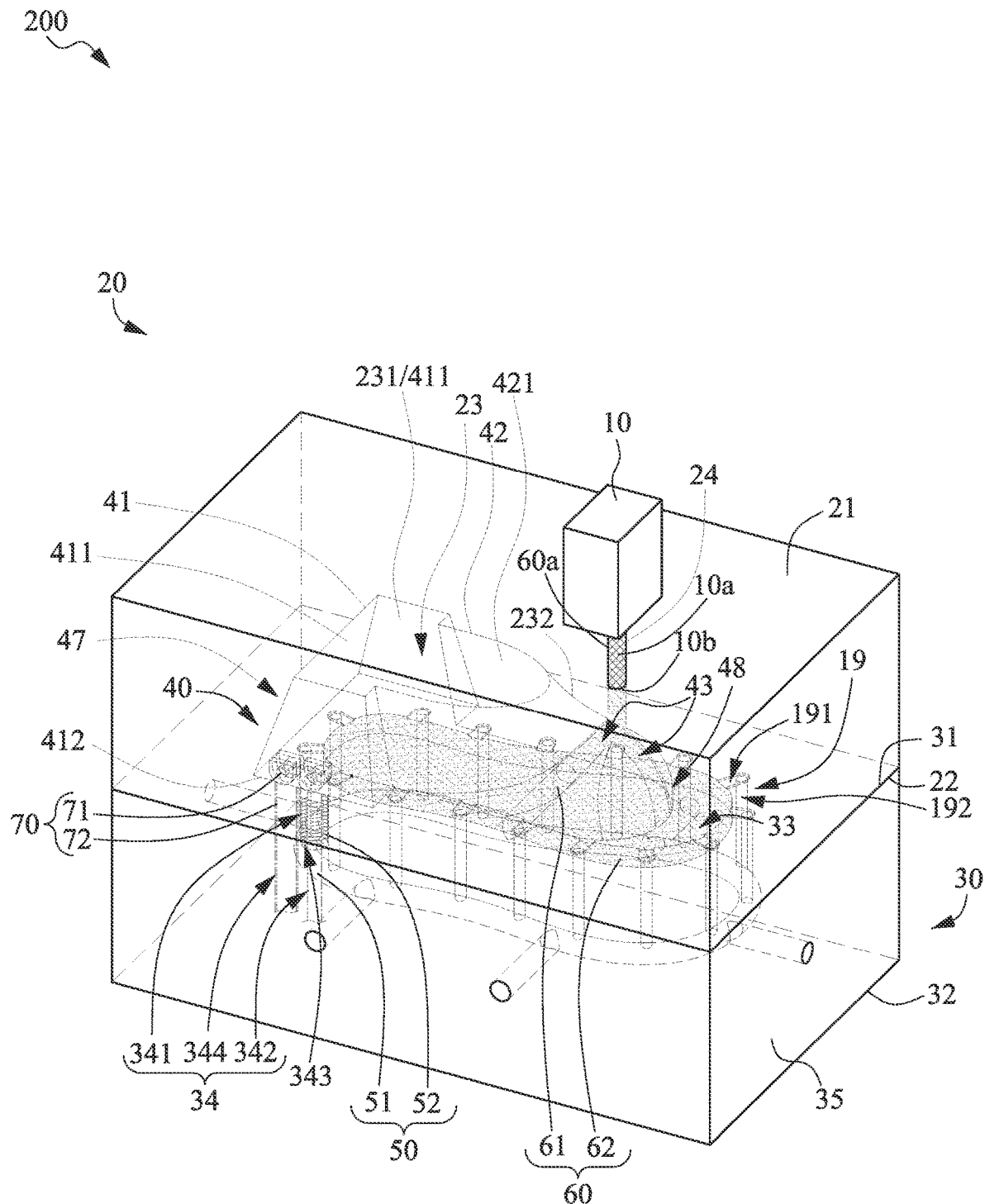
FIG. 6A is a schematic perspective view of a molding device at one or more manufacturing stages of a molding method according to some embodiments of the present invention.
Figure 6B:
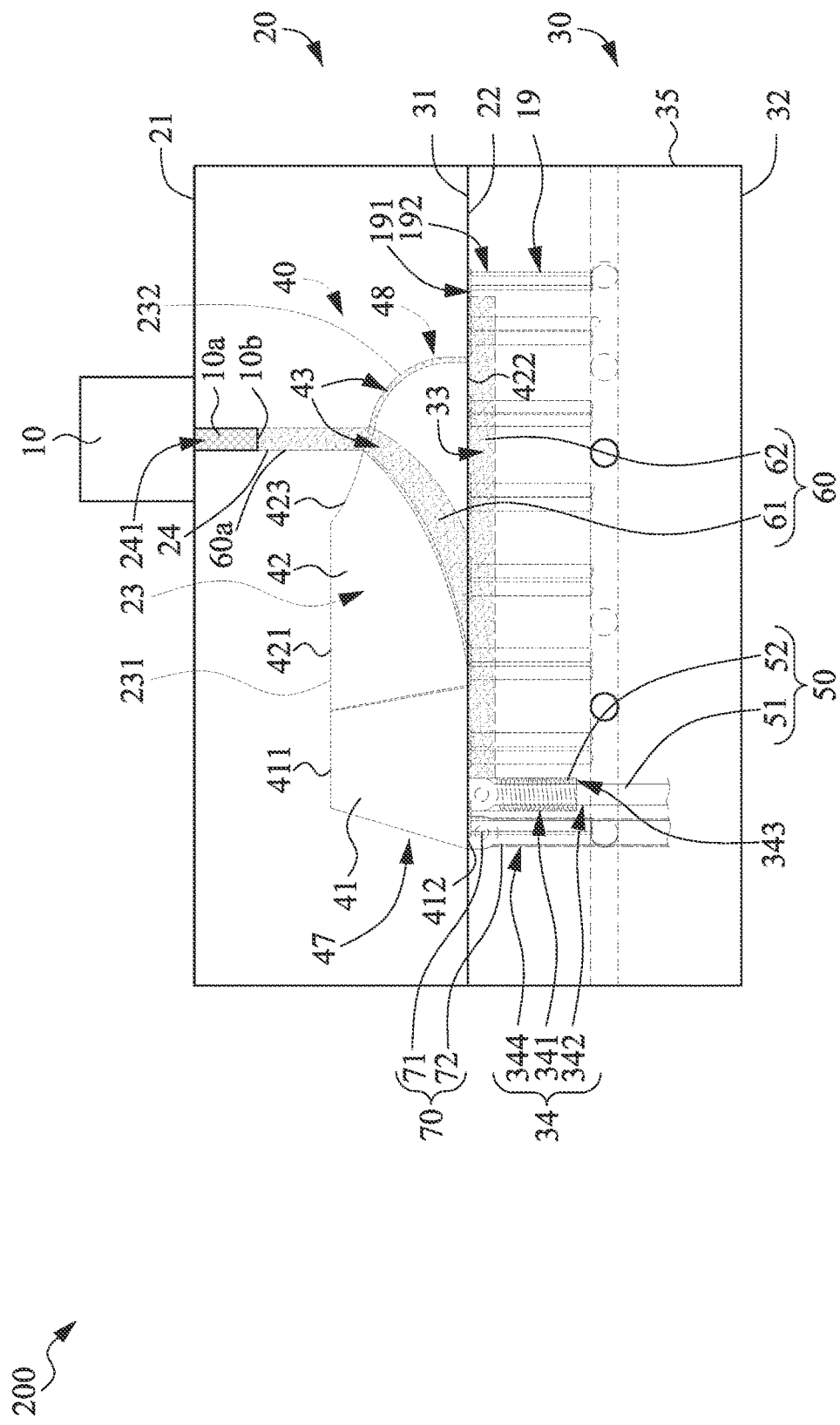
FIG. 6B is a side view of the molding device of FIG. 6A.

FIG. 6A is a schematic perspective view of a molding device 200 at operation 105 of the molding method 100 according to some embodiments of the present invention. FIG. 6B is a side view of the molding device 200 of FIG. 6A. Referring to FIGS. 6A and 6B, in some embodiments, in operation 105, a molding material 60a is injected into the first mold cavity 14 and at least partially surrounding the middle mold 40 to form an article 60 in the first mold cavity 14.

In some embodiments, the molding material 60a is injected into the first mold cavity 14 through the opening 241 of the feeding port 24. In some embodiments, the molding material 60a is injected into the first mold cavity 14 when the molding device 200 is in a closed configuration or when the upper mold 20 and the lower mold 30 are engaged with each other. In some embodiments, the molding material 60a a polymeric material such as ethylene vinyl acetate (EVA), styrene-ethylene-butylene-styrene (SEBS), thermoplastic polyurethanes (TPU), thermoplastic polyester elastomer (TPEE) or the like. In some embodiments, the molding material 60a further includes a blowing agent. In some embodiments, the molding material 60a may be foamable material or less foamable material. In some embodiments, the molding material 60a includes a recyclable material. In some embodiments, the molding material 60a may be non-foamable material. In some embodiments, the molding material 60a may fill up the first mold cavity 14 (including the first portion 141 and the second portion 142).

In some embodiments, the molding material 60a is discharged from the outlet 10b and includes a polymeric material. In some embodiments, the molding material 60a is flowable along the extruding system 10 and dischargeable from the outlet 10b. In some embodiments, the molding material 60a is flowable and formed by hot-melting or any other suitable processes. The technical details of hot-melting are known in the prior art, and description thereof is omitted herein.

In some embodiments, an article 60 is integrally formed from the molding material 60a in the first mold cavity 14. In some embodiments, the article 60 is free from adhesive. The article 60 may be a shoe such as a slipper, flip-flop, or a sandal. In some embodiments, the article 60 includes a base portion 62 (e.g., a sole portion) and at least one upper portion 61 (e.g., a strap portion). In some embodiments, the upper portion 61 of the article 60 is formed from a first portion of the molding material 60a disposed in the first portion 141 of the first mold cavity 14. In some embodiments, the base portion 62 of the article 60 is formed from a second portion of the molding material 60a disposed in the second portion 142 of the first mold cavity 14. In addition, an additional pin 63 may be formed from a third portion of the molding material 60a disposed in the feeding port 24. The additional pin 63 may be connected to the upper portion 61 of the article 60. In some embodiments, since the gas slits 191 of the gas discharging mechanism 19 are in communication with the first mold cavity 14, at least a portion of a gas is discharged out of the first mold cavity 14 through the slits 191 after the injection of the molding material 60a. In some embodiments, due to a portion of the gas is discharged from the first mold cavity 14, there is room in the first mold cavity 14 for the molding material 60a to foam.

Figure 6C:
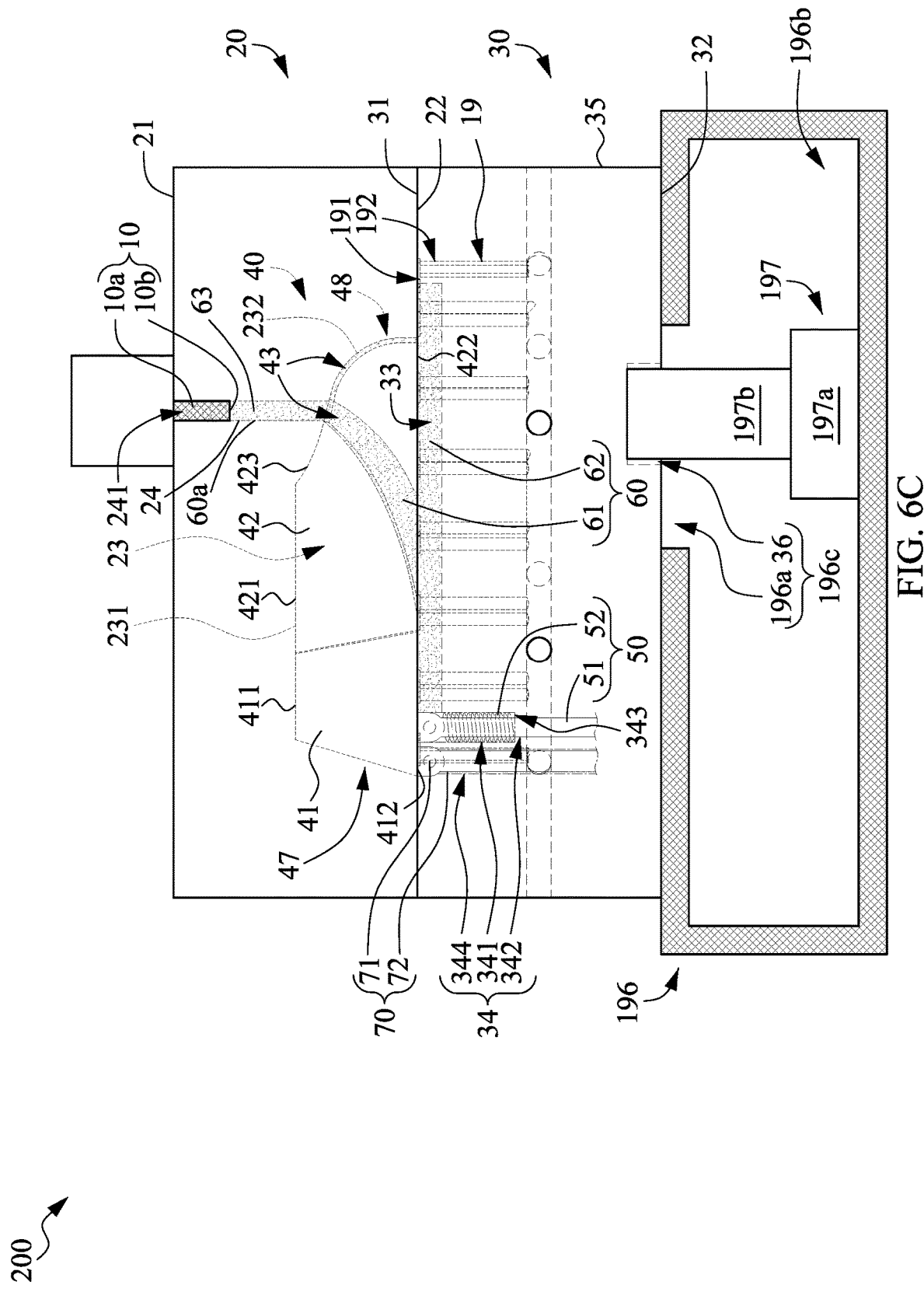
FIG. 6C is a side view of a molding device at one or more manufacturing stages of a molding method according to some embodiments of the present invention.

FIG. 6C is a schematic perspective view of a molding device 200 at operation 106 of the molding method 100 according to some embodiments of the present invention. Referring to FIG. 6C, in some embodiments, in operation 106, a plunging force is applied to the lower mold 30 and the upper mold 20 by extending the rod 197b through the first opening 196a towards the lower mold 30 during the injection of the molding material 60a into the first mold cavity 14. In some embodiments, the second opening 36 of the lower mold 30 is vertically aligned with the rod 197b of the plunger 197 during the application of the plunging force. In some embodiments, the rod 197b of the plunger 197 is aligned with the passage 196c.

During the discharge of the molding material 60a from the extruding system 10 into the first mold cavity 14, the discharging channel 10a and the outlet 10b are overlapped with the feeding port 24, the passage 196c and the rod 197b from a top view.

In some embodiments, the rod 197b contacts the lower mold 30 during the application of the plunging force. In some embodiments, the rod 197b extends and passes through the passage 196c to contact the lower mold 30 and press the lower mold 30 towards the upper mold 20. The plunging force is applied on the lower mold 30 towards the upper mold 20. In some embodiments, the upward plunging force is applied to the molding device 200. In some embodiments, the plunging force is in a range of about 30N to about 80N. In some embodiments, the plunging force is about 50N. The lower mold 30 and the upper mold 20 are tightly engaged with each other during the application of the plunging force. In some embodiments, the plunger 197 is in an extended configuration as shown in FIG. 6C.

In some embodiments, the molding material 60a is forced and pushed into the first mold cavity 14 through the outlet 10b by an injecting force. In some embodiments, a direction of the injecting force is from the discharging channel 10a towards the second opening 36. In some embodiments, the direction of the injecting force is opposite to the direction of the plunging force.

In some embodiments, in operation 107, after the article 60 is formed in the first mold cavity 14, discharging at least a portion of a gas out of the first mold cavity 14 through the slit 191 of the gas discharging mechanism 19 adjacent to the first mold cavity 14. After the article 60 is formed in the first mold cavity 14, at least a portion of the gas is discharged out of the first mold cavity 14 to the gas conduit 192 of the gas discharging mechanism 19 through the slit 191 between the first mold cavity 14 and the gas conduit 192. In some embodiments, the injection of the molding material 60a raises a pressure of the first mold cavity 14, and the gas in the first mold cavity 14 enters the slits 191 due to the positive pressure. In some embodiments, only the gas in the first mold cavity 14 enters the slits 191, the molding material 60a remains in the first mold cavity 14. In some embodiments, the portion of the gas is discharged out of the molding device 200 through the gas conduits 192 of the gas discharging mechanism 19.

Figure 7:
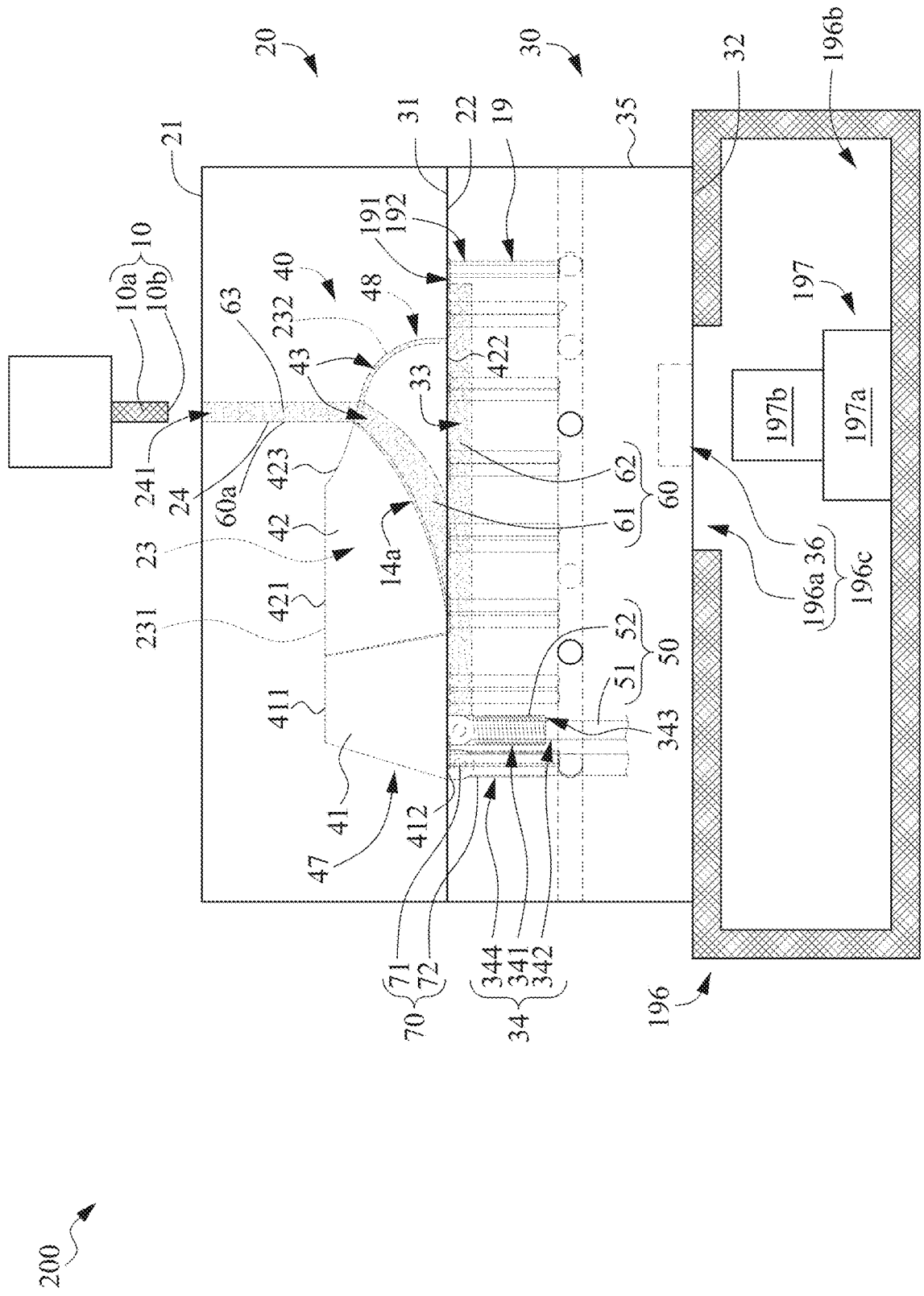
FIG. 7 is a side view of a molding device at one or more manufacturing stages of a molding method according to some embodiments of the present invention.

FIG. 7 is a schematic perspective view of a molding device 200 at operation 107 of the molding method 100 according to some embodiments of the present invention. Referring to FIG. 7, in some embodiments, after the article 60 is formed in the first mold cavity 14, separating the upper mold 20 and the lower mold 30 to form a second mold cavity 14a and discharge at least a portion of a gas out of the second mold cavity 14a. In some embodiments, a volume of the second mold cavity 14a is greater than the first mold cavity 14, and the molding device 200 having the second mold cavity 14a is maintained in the closed configuration. In some embodiments, the second mold cavity 14a is formed by withdrawing the extruding system 10 and/or retracting the rod 197b towards the base 197a of the plunger 197, and the volume of the second mold cavity 14a is slightly greater than that of the first mold cavity 14.

In some embodiments, when the injection of the molding material 60a into the first mold cavity 14 is accomplished, the extruding system 10 is withdrawn and moved away from the molding device 200. In some embodiments, when the injection of the molding material 60a into the first mold cavity 14 is accomplished, the rod 197b is retracted towards the base 197a and the plunging force is withdrawn by retracting the rod 197b. In some embodiments, when the injection of the molding material 60a into the first mold cavity 14 is accomplished, the outlet 10b is disengaged from the feeding port 24, and the rod 197b is moved away from the molding device 200. The plunger 197 is back to the retracted configuration as shown in FIG. 7.

In some embodiments, the method 100 includes retracting the rod 197b towards the base 197a after the injection of the molding material 60a to discharge at least a portion of the gas out from the first mold cavity 14. After the withdrawn of the plunging force and/or the injection force, the molding device 200 is continuously maintained in the closed configuration and the second mold cavity 14a is formed, and at least a portion of the gas is discharged from the second mold cavity 14a to the slits 191 of the gas discharging mechanism 19. In some embodiments, the molding device 200 is disposed on the platform 196 and is free from the gas discharging mechanism 19, after the withdrawn of the plunging force and/or the injection force, the upper mold 20 and the lower mold 30 are no longer clamped by the plunging force and/or the injection force, and at least a portion of the gas is discharged through a space between the lower mold 30 and the upper mold 20.

Figure 8A:
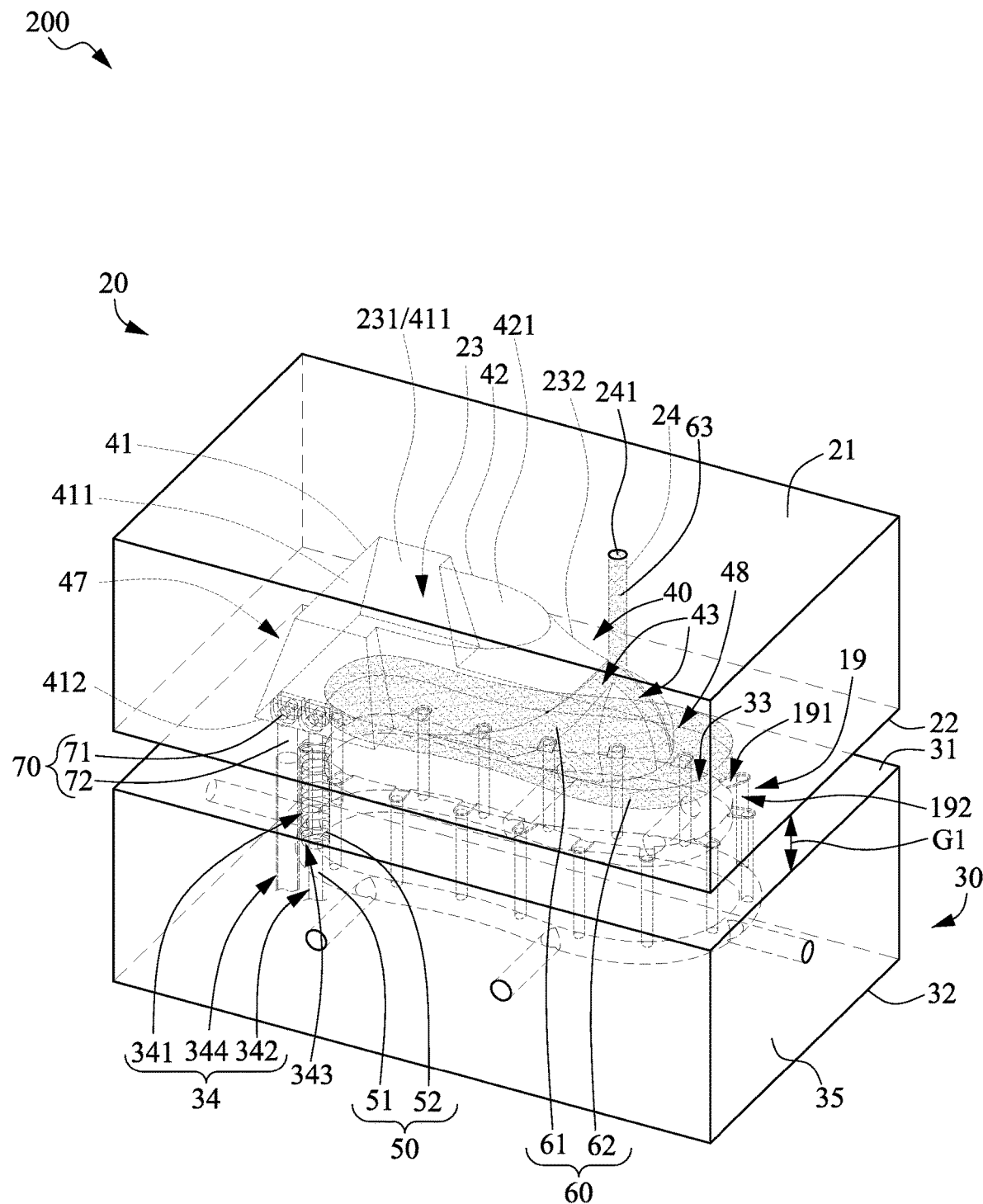
FIG. 8A is a schematic perspective view of a molding device at one or more manufacturing stages of a molding method according to some embodiments of the present invention.
Figure 8B:
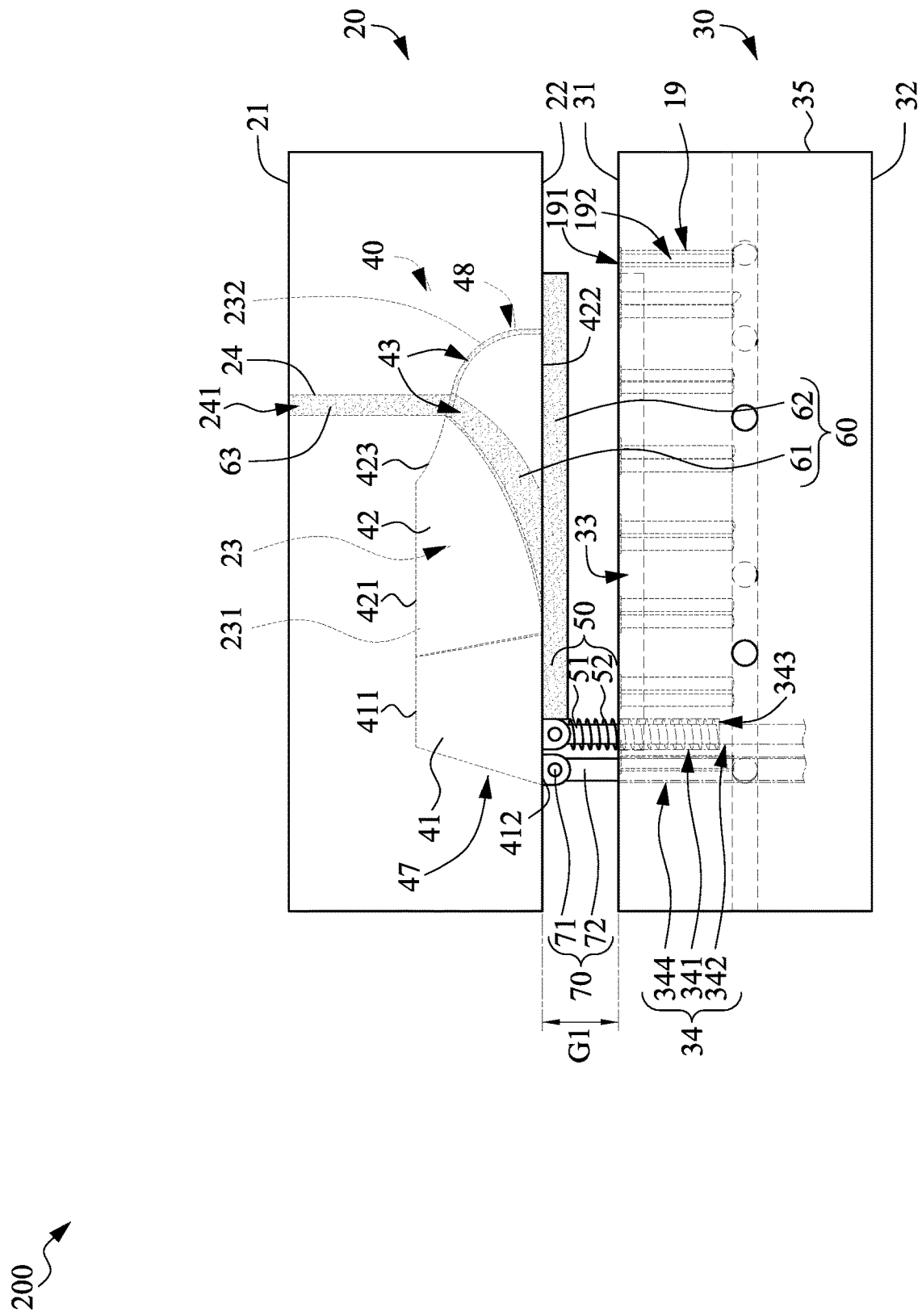
FIG. 8B is a side view of the molding device of FIG. 8A.

FIG. 8A is a schematic perspective view of a molding device 200 at operation 108 of the molding method 100 according to some embodiments of the present invention. FIG. 8B is a side view of the molding device 200 of FIG. 8A. Referring to FIGS. 8A and 8B, in some embodiments, in operation 108, the upper mold 20 is disengaged from the lower mold 30.

In operation 108, in some embodiments, the relative movement between the upper mold 20 and the lower mold 30 occurs, and the distance between the upper mold 20 and the lower mold 30 increases gradually. Meanwhile, the article 60 is held or attached on the middle mold 40, and the additional pin 63 is still attached on the article 60. In some embodiments, the position of the upper mold 20 is fixed, and only the lower mold 30 is moved away from the upper mold 20. Meanwhile, the middle mold 40 is sustained in the upper mold 20. In some embodiments, the relative movement between the middle mold 40 and the lower mold 30 is achieved by a pushing force applied to the middle mold 40 by the position control mechanism 50. Such pushing force is converted from the elastic potential energy stored in the pressed biasing member 52 of FIG. 4A and FIG. 4B.

In some embodiments, the position of the lower mold 30 is fixed, and the upper mold 20 and the middle mold 40 may move away from the lower mold 30 simultaneously. Meanwhile, the middle mold 40 is sustained in the upper mold 20 and moved with the upper mold 20. In some embodiments, the relative movement between the middle mold 40 and the lower mold 30 is achieved by a pushing force applied to the middle mold 40 by the position control mechanism 50.

Figure 9B:
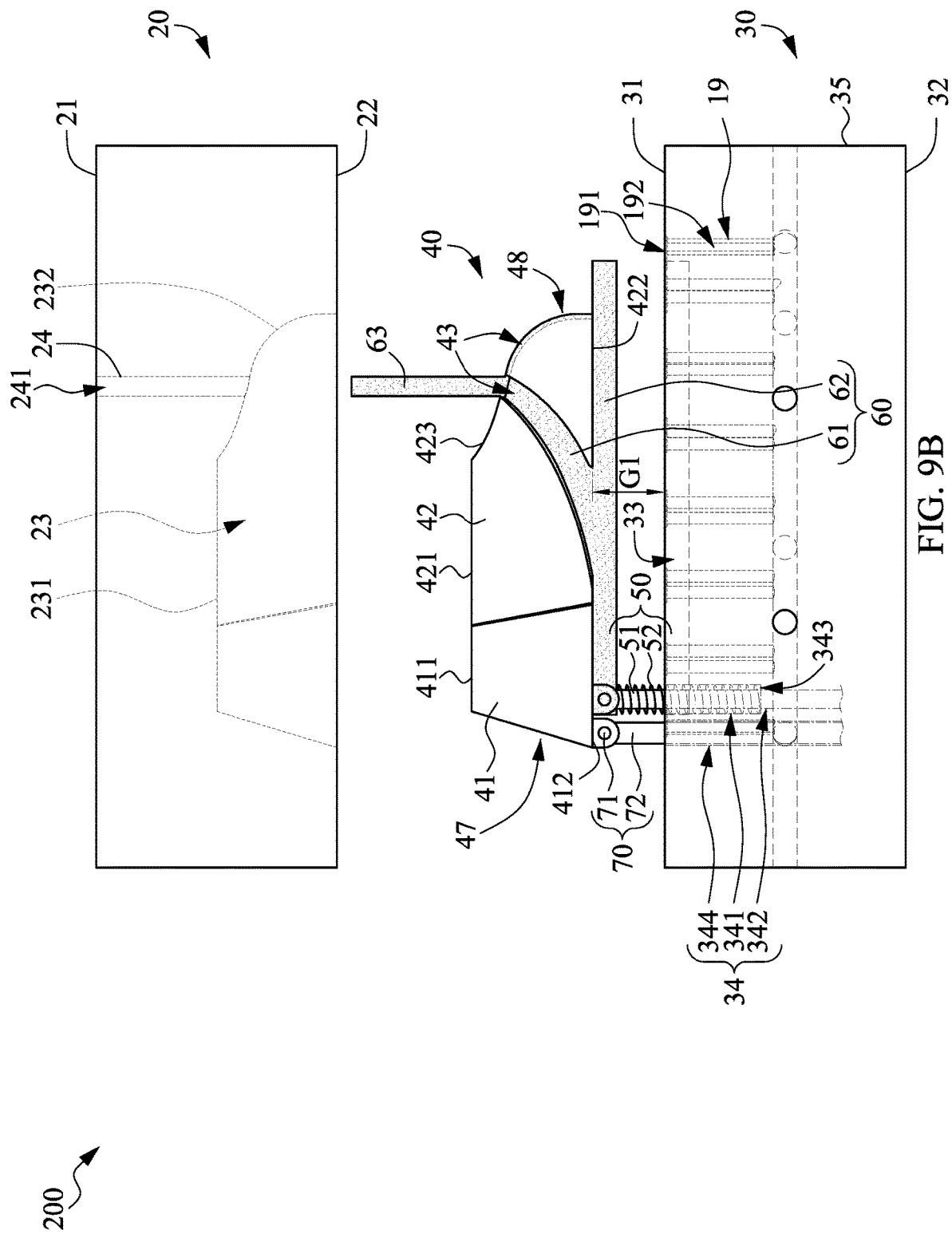
FIG. 9B is a side view of the molding device of FIG. 9A.

FIG. 9A is a schematic perspective view of a molding device 200 at operation 109 of the molding method 100 according to some embodiments of the present invention. FIG. 9B is a side view of the molding device 200 of FIG. 9A. Referring to FIGS. 9A and 9B, in some embodiments, in operation 109, the middle mold 40 and the article 60 are lifted from the lower mold 30 before tilting the middle mold 40, wherein the article 60 is held by the middle mold 40. Referring to FIG. 9A and FIG. 9B, the relative movement between the upper mold 20 and the lower mold 30 continues so as to separate the upper mold 20 from the middle mold 40. Meanwhile, the article 60 remains on the middle mold 40. In some embodiments, the position of the upper mold 20 is fixed, and the lower mold 30 and the middle mold 40 move together away from the upper mold 20 since a maximum displacement of the middle mold 40 is limited by the position control mechanism 50 attached to the lower mold 30. In some embodiments, the position of the lower mold 30 is fixed, and the upper mold 20 is move away from the lower mold 30 and the middle mold 40. As shown in FIG. 9B, a distance between the middle mold 40 and the upper mold 20 is greater than a distance between the middle mold 40 and the lower mold 30. In some embodiments, the gap G1 between the top surface 31 of the lower mold 30 and a bottom surface the middle mold 40 is generated by the position control mechanism 50 attached to the middle mold 40 and the lower mold 30.

FIG. 10 is a side view of a molding device 200 at operation 110 of the molding method 100 according to some embodiments of the present invention. Referring to FIG. 10, in some embodiments, in operation 110, the middle mold 40 and the article 60 are tilt relative to the lower mold 30. In some embodiments, the middle mold 40 pivots about the fulcrum 71 to tilt the middle mold 40, and the middle mold 40 has an angle σ relative to the lower mold 30. In some embodiments, the first end 47 of the middle mold 40 is lower than the second end 48 when the middle mold 40 is tilted.

In some embodiments, the middle mold 40 and the article 60 are tilted relative to the lower mold 30 when the gap G1 between the lower mold 30 and the middle mold 40 is equal to or greater than zero. In some embodiments, the middle mold 40 and the article 60 are tilted when the fulcrum 71 is disposed within the lower mold cavity 33. In some embodiments, the middle mold 40 and the article 60 are tilted when the fulcrum 71 is disposed above the lower mold 30.

Figure 11:
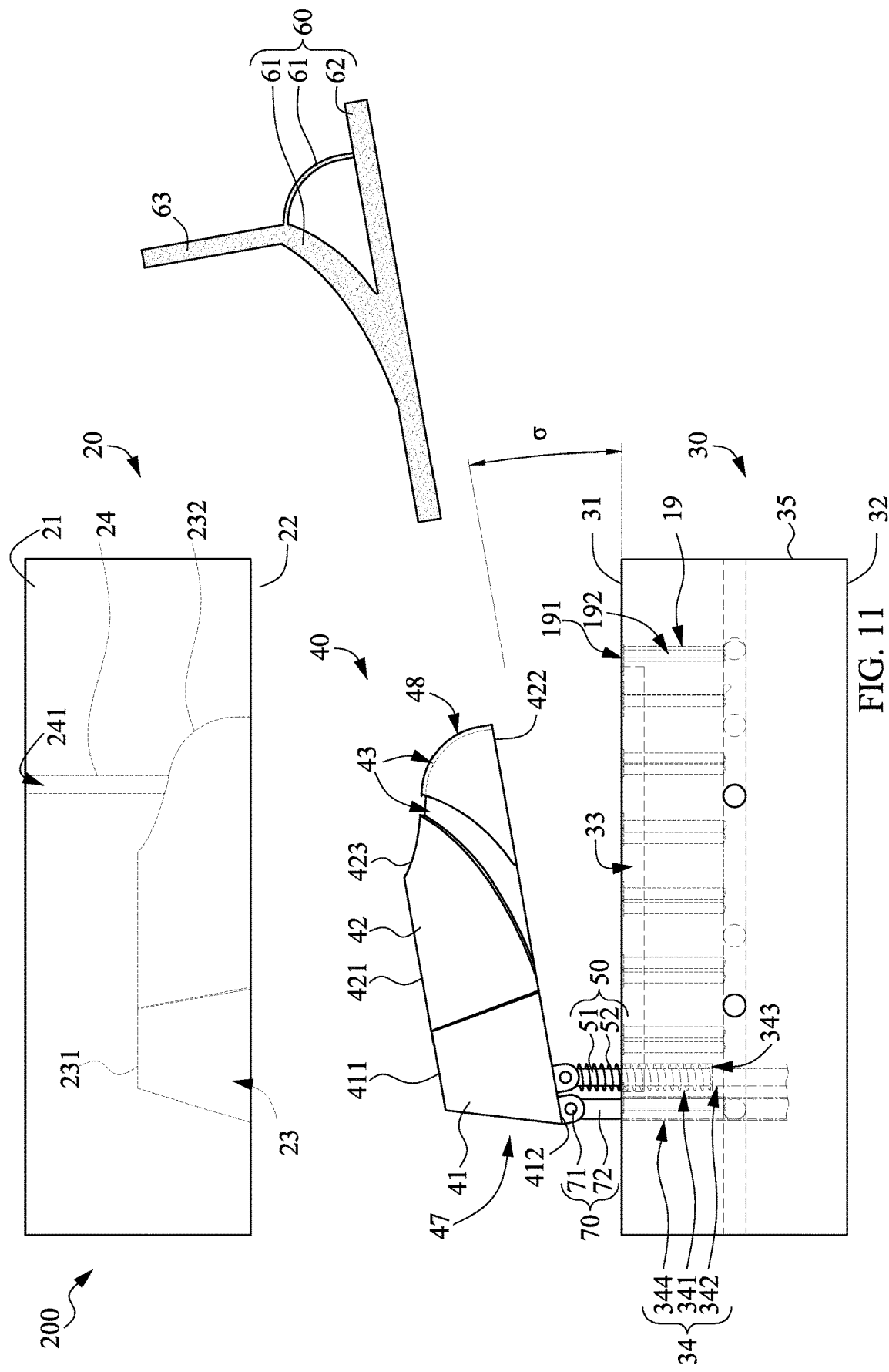

FIG. 11 is a side view of a molding device 200 at operation 111 of the molding method 100 according to some embodiments of the present invention. Referring to FIG. 11, in some embodiments, in operation 111, after tilting the middle mold 40, the article 60 is detached from the middle mold 40. In some embodiments, the article 60 is detached from the second end 48 of the middle mold 40. In some embodiments, the tilted middle mold 40 and the gap G1 between the top surface 31 of the lower mold 30 and the bottom surface of the middle mold 40 facilitates the detachment of the article 60.

Figure 12:
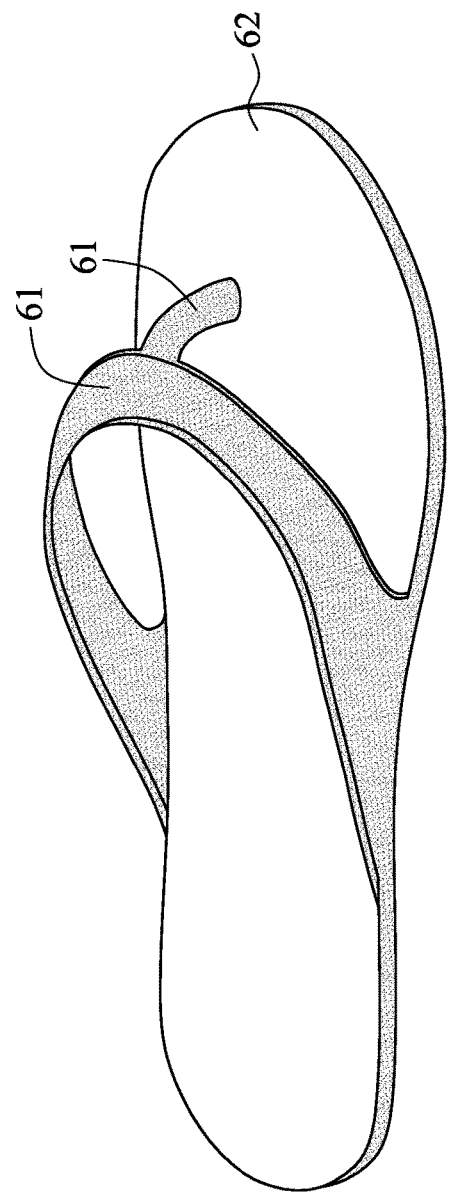
FIG. 12 is a schematic perspective view of the article according to some embodiments of the present invention.

In some embodiments, the additional pin 63 is removed from the article 60 so as to obtain the article 60 as shown in FIG. 12. In some embodiments, some of the molding material 60a enters the slit 191 and forms a flake (not shown) attaches to the article 60, the flakes is removed from the article 60.

FIG. 12 is a schematic perspective view of the article 60 according to some embodiments of the present invention. In some embodiments, the article 60 includes a base portion 62 and at least one upper portion 61 connected to base portion 62. In some embodiments, the base portion 62 and the upper portion 61 are formed integrally and concurrently. In some embodiments, there are no interface between the base portion 62 and the upper portion 61.

FIGS. 13 to 20 illustrate a molding method for manufacturing an article according to some embodiments of the present disclosure. In some embodiments, the method is for manufacturing the article 60 shown in FIG. 12.

Figure 13A:
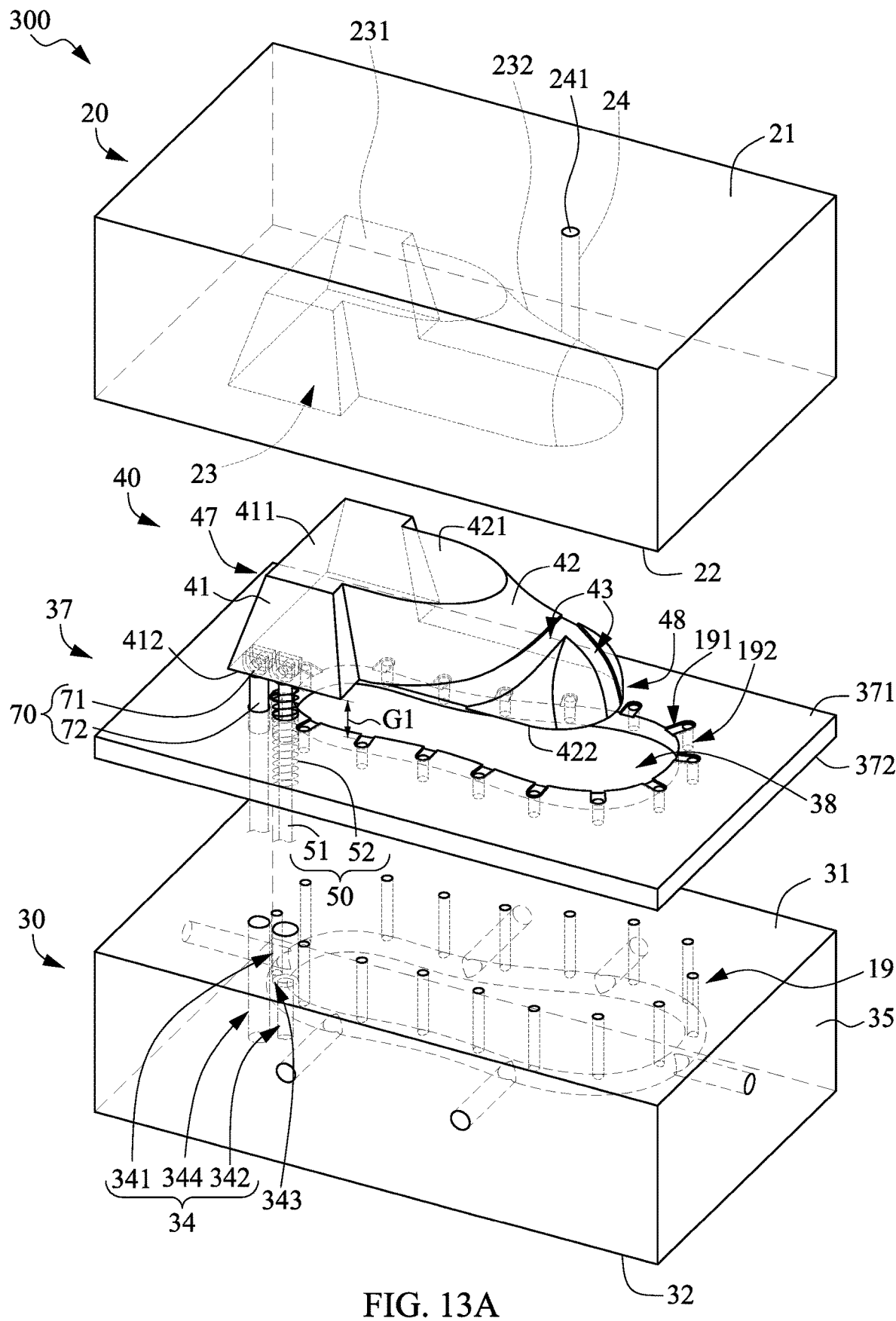
FIG. 13A is a schematic perspective view of a molding device at one or more manufacturing stages of a molding method according to some embodiments of the present invention.
Figure 13B:
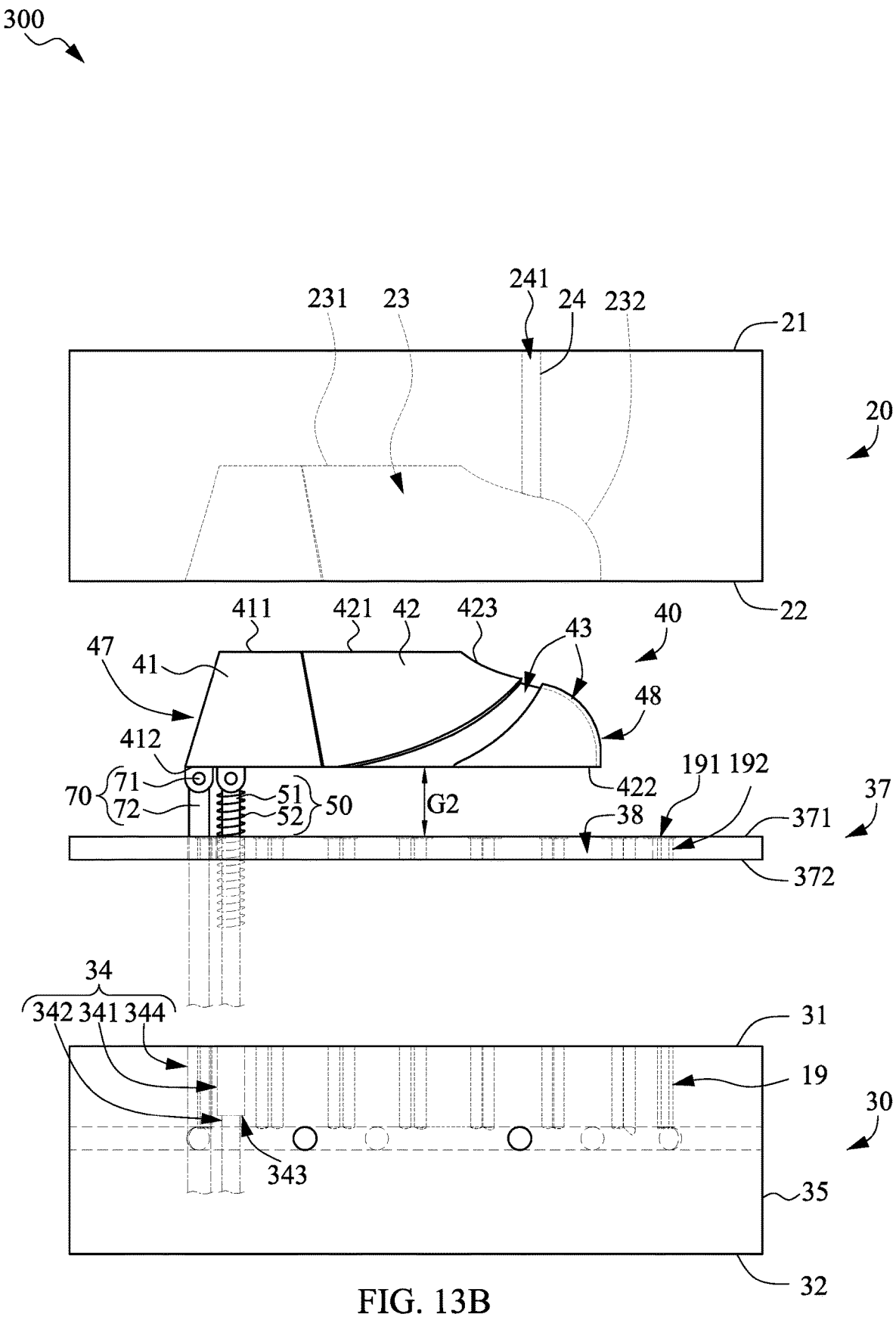
FIG. 13B is a side view of the molding device of FIG. 13A.

Referring to FIG. 13A, a molding device 300 is provided. The molding device 300 includes an upper mold 20, a lower mold 30, a middle mold 40, a mold frame 37, a position control mechanism 50, a tilt mechanism 70, and a gas discharging mechanism 19. In the embodiment illustrated in FIG. 13A, the molding device 300 is in an open configuration. The upper mold 20, the middle 40, the position control mechanism 50, the tilt mechanism 70 of the molding device 300 illustrated in FIG. 13 is similar to the molding device 200 illustrated in FIG. 2A and FIG. 2B, except that the mold frame 37 surrounds middle mold 40 and disposed between the upper mold 20 and the lower mold 30, and the gas discharging mechanism 19 is arranged in the mold frame 37 and the lower mold 30.

In some embodiments, the upper mold 20 is placed on and engaged with the mold frame 37, and the mold frame 37 may be placed on and engaged with the lower mold 30. In some embodiments, the upper mold 20, the mold frame 37 and the lower mold 30 are complementary with and separable from each other. The upper mold 20 and the lower mold 30 may correspond to the mold frame 37 in some configurations such as dimension, shape or the like. In some embodiments, the upper mold 20, the mold frame 37 and the lower mold 30 are complementary with each other in order to define a mold cavity (not shown). In some embodiments, the upper mold 20, the mold frame 37 and the lower mold 30 are separated from each other.

Figure 14:
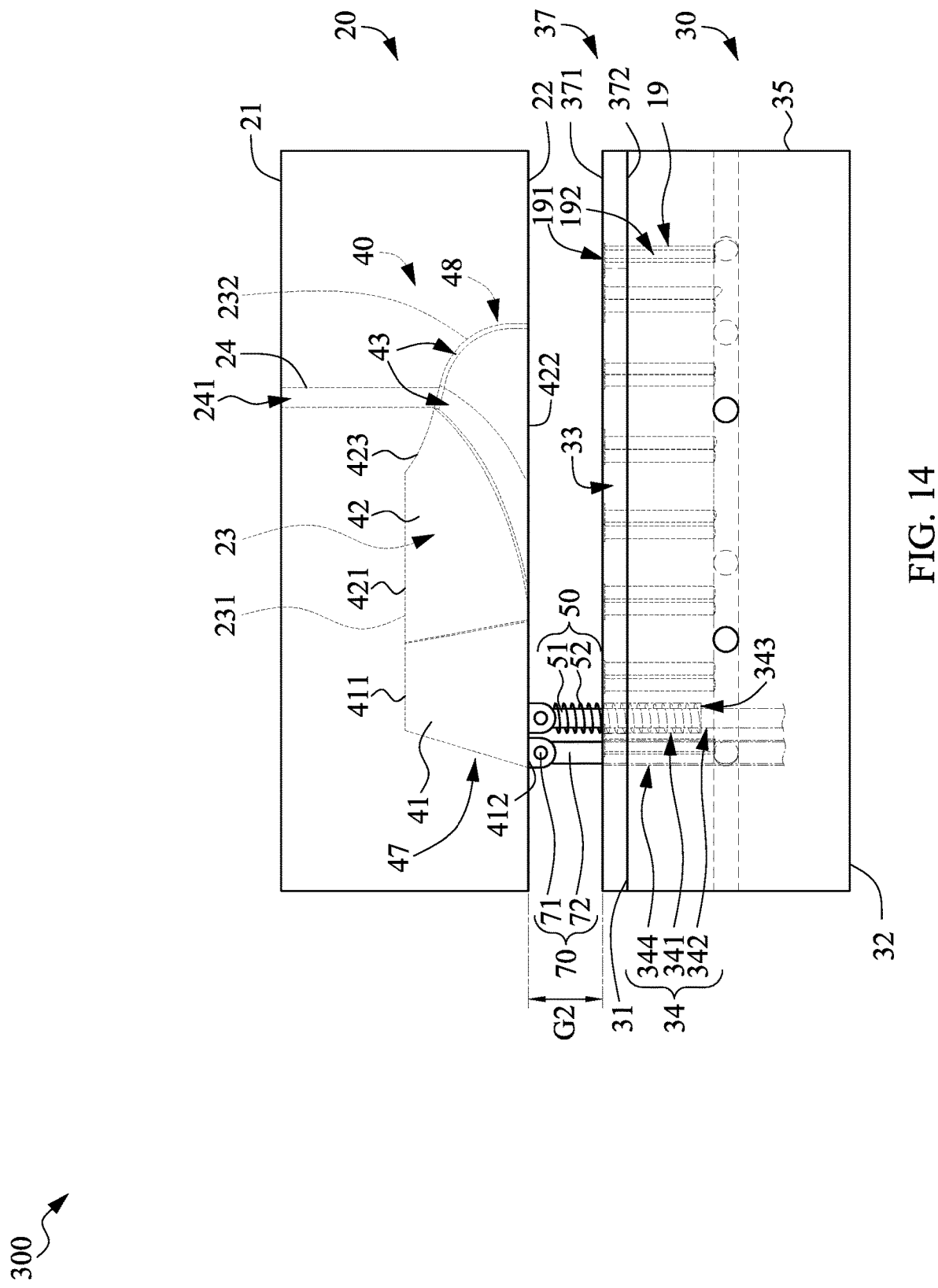
FIGS. 14 to 20 are side views of a molding device at one or more manufacturing stages of a molding method according to some embodiments of the present invention.

In some embodiments, the mold frame 37 includes a third opening 38, and the lower mold cavity 33 is defined by the third opening 38 of the mold frame 37 and the top surface 31 of the lower mold 30 as shown in FIG. 14. In some embodiments, referring to FIG. 13A and FIG. 13B, the middle mold 40 is configured to dispose on the top surface 31 of the lower mold 30, and a portion of the middle mold 40, a portion of the position control mechanism 50 and a portion of the tilt mechanism 70 are surrounded by the mold frame 37. In some embodiments, a portion of the top surface 31 of the lower mold 30 configured to dispose the middle mold 40 over is coplanar with another portion of the top surface 31 of the lower mold 30 configured to dispose the upper mold 20 over. In some embodiments, the mold frame 37 includes a top surface 371 and a bottom surface 372 opposite to the top surface 371. The top surface 371 faces the upper mold 20 and the bottom surface 372 faces the lower mold 30.

Configuration (e.g., dimension or shape) of the upper mold cavity 23 of the upper mold 20 and the third opening 38 of the mold frame 37 may correspond to a configuration (e.g., dimension or shape) of the middle mold 40. In some embodiments, the hole structure 34 is defined in the lower mold 30 and the mold frame 37. In some embodiments, the first hole 341 includes an opening formed on the top surface 371 of the mold frame 37 and extends into the lower mold 30. In some embodiments, the biasing member 52 and the bar member 72 extend through the mold frame 37.

Figure 15:
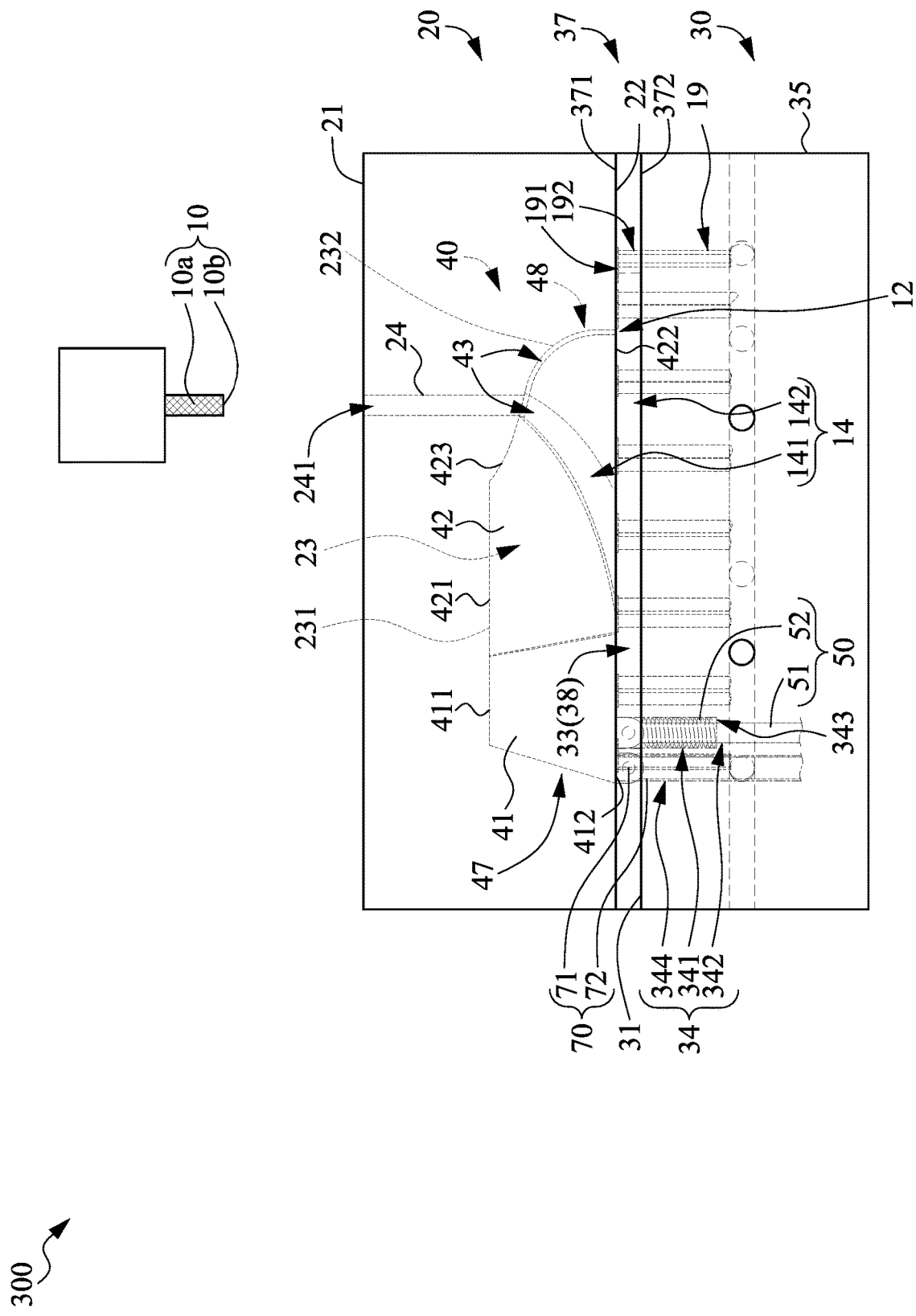

In some embodiments, the gas discharging mechanism 19 is disposed within the mold frame 37 and the lower mold 30. The gas discharging mechanism 19 includes a gas conduit 192 disposed adjacent to the third opening 38 and defined by the mold frame 37 and the lower mold 30, and a slit 191 jointly defined by the upper mold 20 and the mold frame 37 when the molding device 300 is in the closed configuration as shown in FIG. 15. In some embodiments, the slit 191 is in communication with the third mold cavity 14b and the gas conduit 192. In some embodiments, the slit 191 is indented from the top surface 371 of the mold frame 37.

Referring to FIG. 14, the mold frame 37 is disposed on the lower mold 30, and a distance between the upper mold 20 and the mold frame 37 is reduced gradually. As shown in FIG. 14, a relative movement between the upper mold 20 and the mold frame 37 occurs. In some embodiments, the position of the upper mold 20 is fixed, and the mold frame 37, the lower mold 30 and the middle mold 40 are moved together toward the upper mold 20. In some embodiments, the positions of the mold frame 37, the lower mold 30 and the middle mold 40 are fixed, and the upper mold 20 moves toward the mold frame 37, the lower mold 30 and the middle mold 40. At the stage illustrated in FIG. 14, the middle mold 40 is accommodated in the upper mold cavity 23 and not yet disposed in the lower mold cavity 33. That is, the middle mold 40 accommodates the upper mold 20 before the mold frame 37 and the lower mold 30 accommodates the upper mold 20. In some embodiments, a gap G2 between the top surface 371 of the mold frame 37 and the bottom surface of the middle mold 40 has not changed. In some embodiments, at the stage illustrated in FIG. 14, the gap G2 reaches its maximum value.

Referring to FIG. 15, in some embodiments, the upper mold 20 is engaged with the mold frame 37 and the lower mold 30 to define an accommodating space 12 and the middle mold 40 is disposed within the accommodating space 12, wherein the upper mold 20, the middle mold 40, the mold frame 37 and the lower mold 30 jointly define a third mold cavity 14b. The third mold cavity 14b is configured to accommodate a molding material (not shown) and to mold the molding material into the article 60 having predetermined shape. The feeding port 24 of the upper mold 20 is in communication with the third mold cavity 14b.

In some embodiments, the relative movement between the upper mold 20 and the mold frame 37 continues until the distance between the upper mold 20 and the mold frame 37 is reduced to zero. In some embodiments, the position of the upper mold 20 is fixed, the middle mold 40 accommodates in the upper mold 20, and the lower mold 30 and the mold frame 37 move toward the upper mold 20. In some embodiments, the position of the lower mold 30 and the mold frame 37 are fixed, and the upper mold 20 and the middle mold 40 are moved together toward the mold frame 37 and the lower mold 30. In some embodiments, the top surface 31 of the lower mold 30 is in contact with bottom surface of the middle mold 40. In some embodiments, the gap G2 between the top surface 371 of the mold frame 37 and the bottom surface of the middle mold 40 has reduced to zero.

As shown in FIG. 15, the molding device 300 is in a closed configuration, and the upper mold 20 is engaged with the mold frame 37, and the mold frame 37 is engaged with the lower mold 30. In some embodiments, the bottom surface 22 of the upper mold 20 contacts the top surface 371 of the mold frame 37, and the bottom surface 372 of the mold frame 37 and the bottom surface 412 of the main portion 41 contacts the top surface 31 of the lower mold 30. Thus, the upper mold 20, the mold frame 37 and the lower mold 30 jointly define the accommodating space 12 for accommodating the middle mold 40.

The upper mold 20 applies a downward force to the middle mold 40, and the middle mold 40 moves downwardly to press the biasing member 52. In some embodiments, an elastic potential energy is stored in the pressed biasing member 52 when the molding device 300 is in the closed configuration.

In some embodiments, an extruding system 10 configure to produce a molding material (not shown) is disposed over the molding device 300. In some embodiments, a discharging channel 10a communicable with the extruding system 10 and including an outlet 10b disposed distal to the extruding system 10 and configured to discharge the molding material into the third mold cavity 14b is disposed over the molding device 300. The molding device 300 is configured to receive the molding material 60a from the outlet 10b of the discharging channel 10a.

Figure 16:
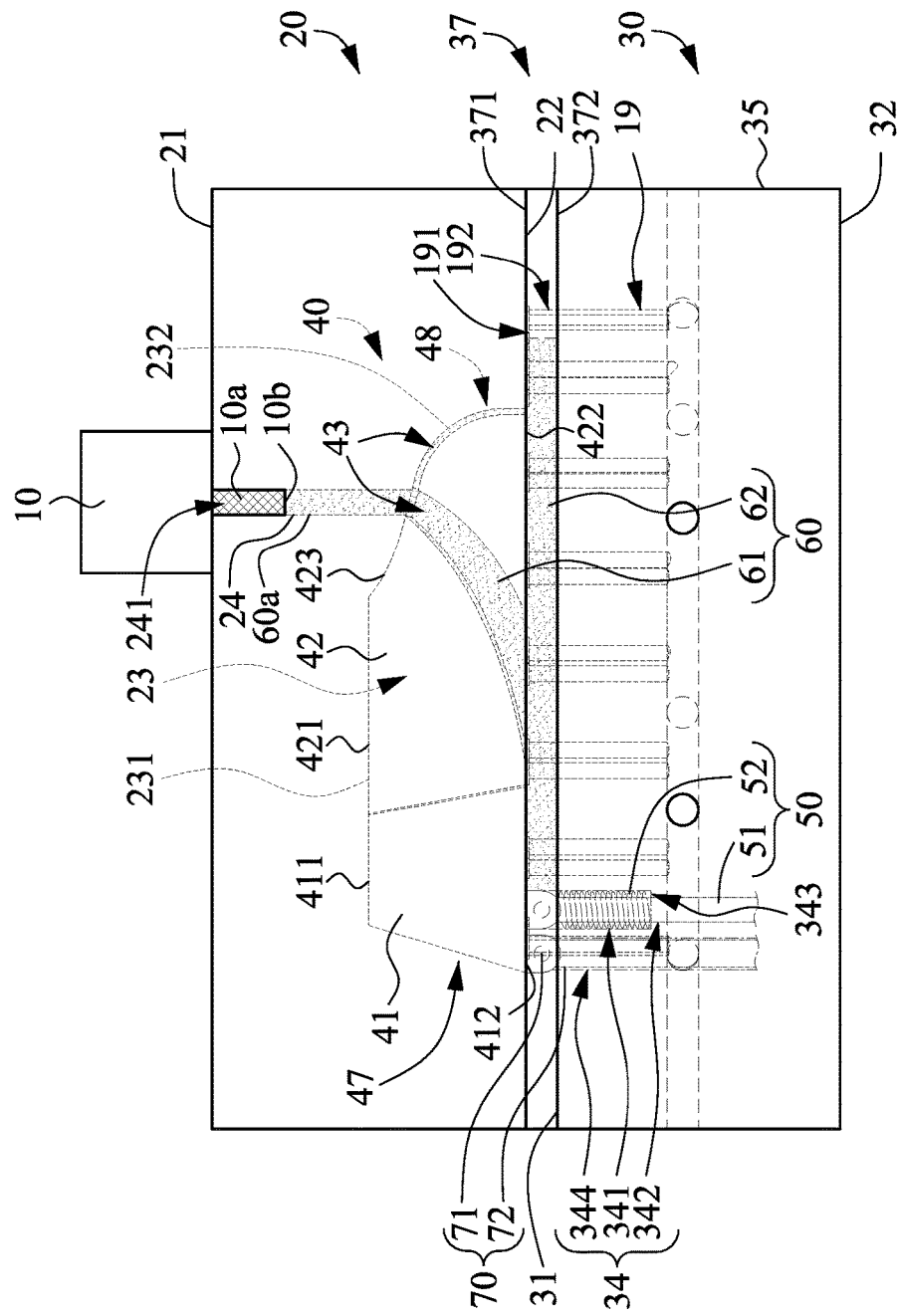

Referring to FIG. 16, is some embodiments, a molding material 60a is injected into the third mold cavity 14b and at least partially surrounding the middle mold 40 to form an article 60 in the third mold cavity 14b. In some embodiments, the opening 241 of the feeding port 24 is engage with the discharging channel 10a. In some embodiments, the molding material 60a is injected into the third mold cavity 14b when the molding device 300 is in a closed configuration or when the upper mold 20 is engaged with the mold frame 37, and the mold frame 37 is engaged with the lower mold 30. In some embodiments, since the gas slits 191 of the gas discharging mechanism 19 are in communication with the third mold cavity 14b, at least a portion of a gas is discharged out of the third mold cavity 14b through the slits 191 after the injection of the molding material 60a. In some embodiments, due to a portion of the gas is discharged from the third mold cavity 14b, there is room in the third mold cavity 14b for the molding material 60a to foam.

In some embodiments, the molding device 300 is disposed over a platform 196 having a first opening 196a as shown in FIG. 6C. In some embodiments, a plunging force provided by a plunger 197 is applied to the molding device 300 during injection of the molding material 60a. The method of providing the plunger force to the molding device 300 may be similar to the method of the application the plunging force to the molding device 200 as shown in FIG. 6C.

In some embodiments, after the article 60 is formed in the third mold cavity 14b, discharging at least a portion of a gas out of the third mold cavity 14b through the slit 191 of a gas discharging mechanism 19 adjacent to the third mold cavity 14b. After the article 60 is formed in the third mold cavity 14b, at least a portion of the gas is discharged out of the third mold cavity 14b to the gas conduit 192 of the gas discharging mechanism 19 through the slit 191 between the third mold cavity 14b and the gas conduit 192. In some embodiments, the injection of the molding material 60a raises a pressure of the third mold cavity 14b, and the gas in the third mold cavity 14b enters the slits 191 due to the positive pressure. In some embodiments, only the gas in the third mold cavity 14b enters the slits 191, the molding material 60a remains in the third mold cavity 14b. In some embodiments, the portion of the gas is discharged out of the molding device 300 through the gas conduits 192 of the gas discharging mechanism 19.

Figure 17:
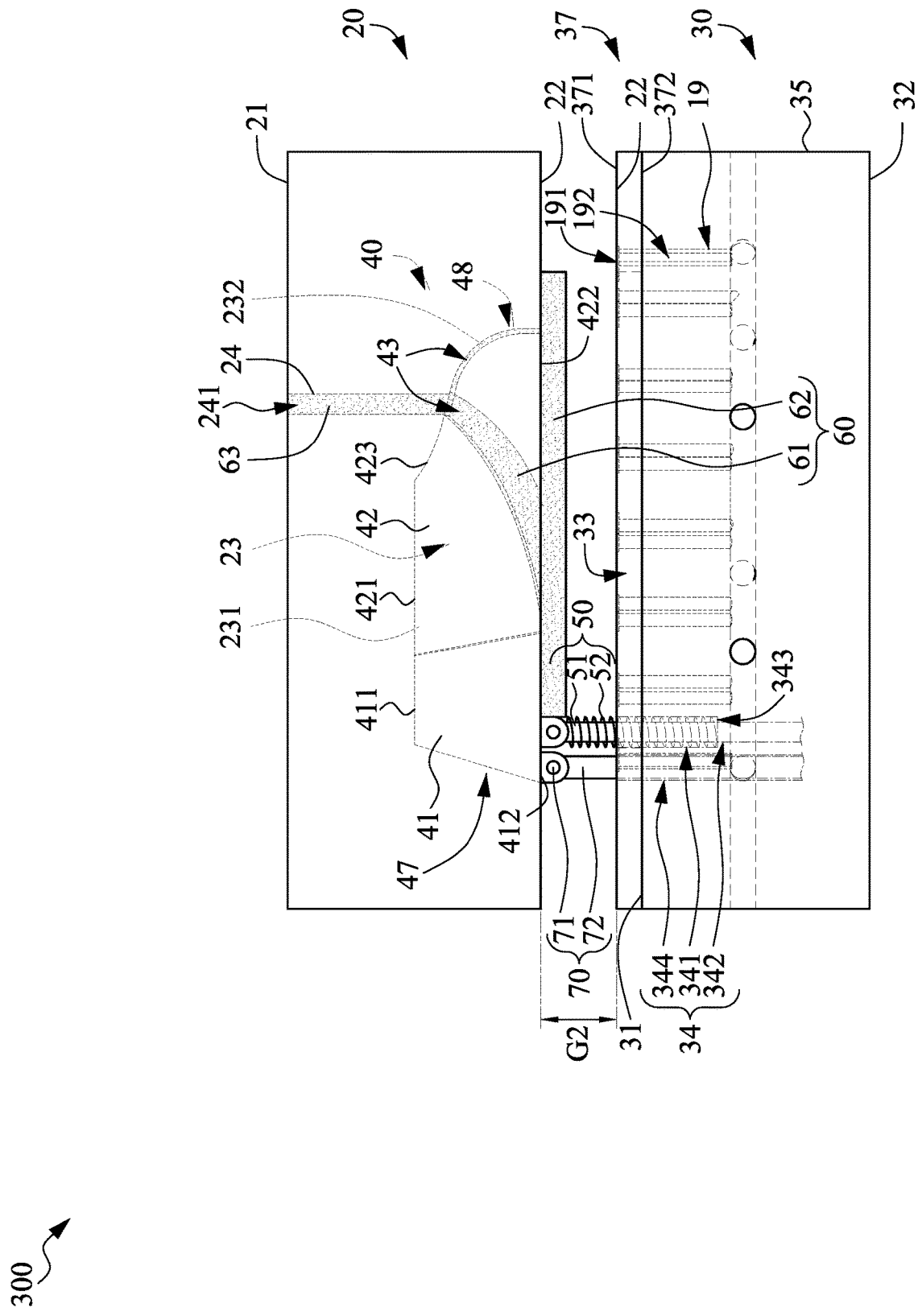

Referring to FIG. 17, in some embodiments, the relative movement between the upper mold 20 and the mold frame 37 occurs, and the distance between the upper mold 20 and the mold frame 37 increases gradually. Meanwhile, the article 60 is held or attached on the middle mold 40, and the additional pin 63 is still attached on the article 60. In some embodiments, the position of the upper mold 20 is fixed, and the mold frame 37 and the lower mold 30 is moved away from the upper mold 20. Meanwhile, the middle mold 40 is sustained in the upper mold 20. In some embodiments, the relative movement between the middle mold 40 and the mold frame 37 is achieved by a pushing force applied to the middle mold 40 by the position control mechanism 50. Such pushing force is converted from the elastic potential energy stored in the pressed biasing member 52 of FIG. 16.

In some embodiments, the position of the mold frame 37 and the lower mold 30 are fixed, and the upper mold 20 and the middle mold 40 move away from the mold frame 37 and the lower mold 30 simultaneously. Meanwhile, the middle mold 40 is sustained in the upper mold 20 and moved with the upper mold 20. In some embodiments, the relative movement between the middle mold 40 and the mold frame 37 is achieved by a pushing force applied to the middle mold 40 by the position control mechanism 50.

Figure 18:
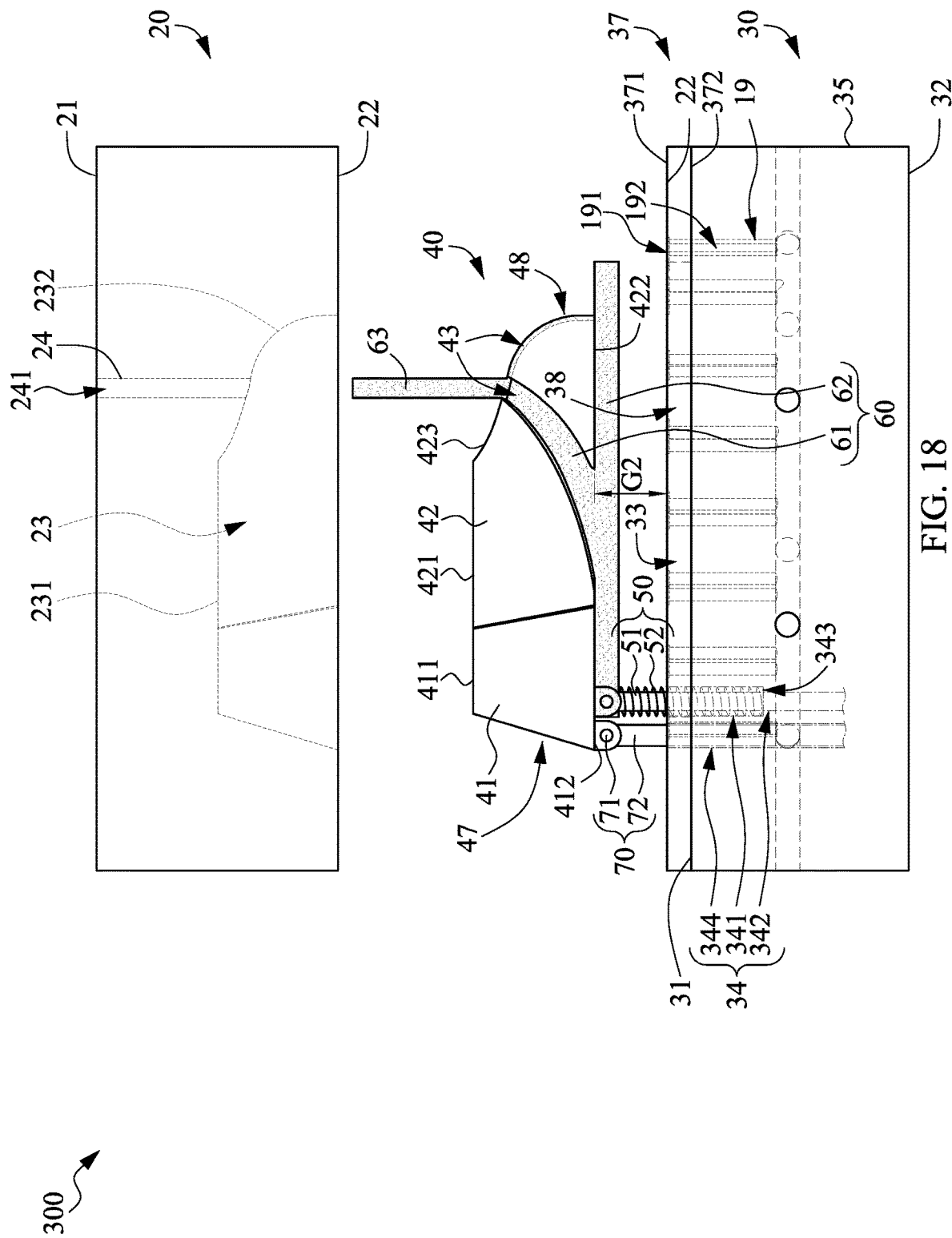

Referring to FIG. 18, in some embodiments, the middle mold 40 and the article 60 are lifted from the lower mold 30 and over the mold frame 37 before tilting the middle mold 40, wherein the article 60 is held by the middle mold 40. In some embodiments, a distance between the middle mold 40 and the upper mold 20 is greater than a distance between the middle mold 40 and the mold frame 37. In some embodiments, a gap G2 between the top surface 371 of the mold frame 37 and a bottom surface 412 of the middle mold 40 is generated by the position control mechanism 50 attached to the middle mold 40 and the mold frame 37. In some embodiments, the gap G2 ranges between 45 mm and 150 mm.

Figure 19:
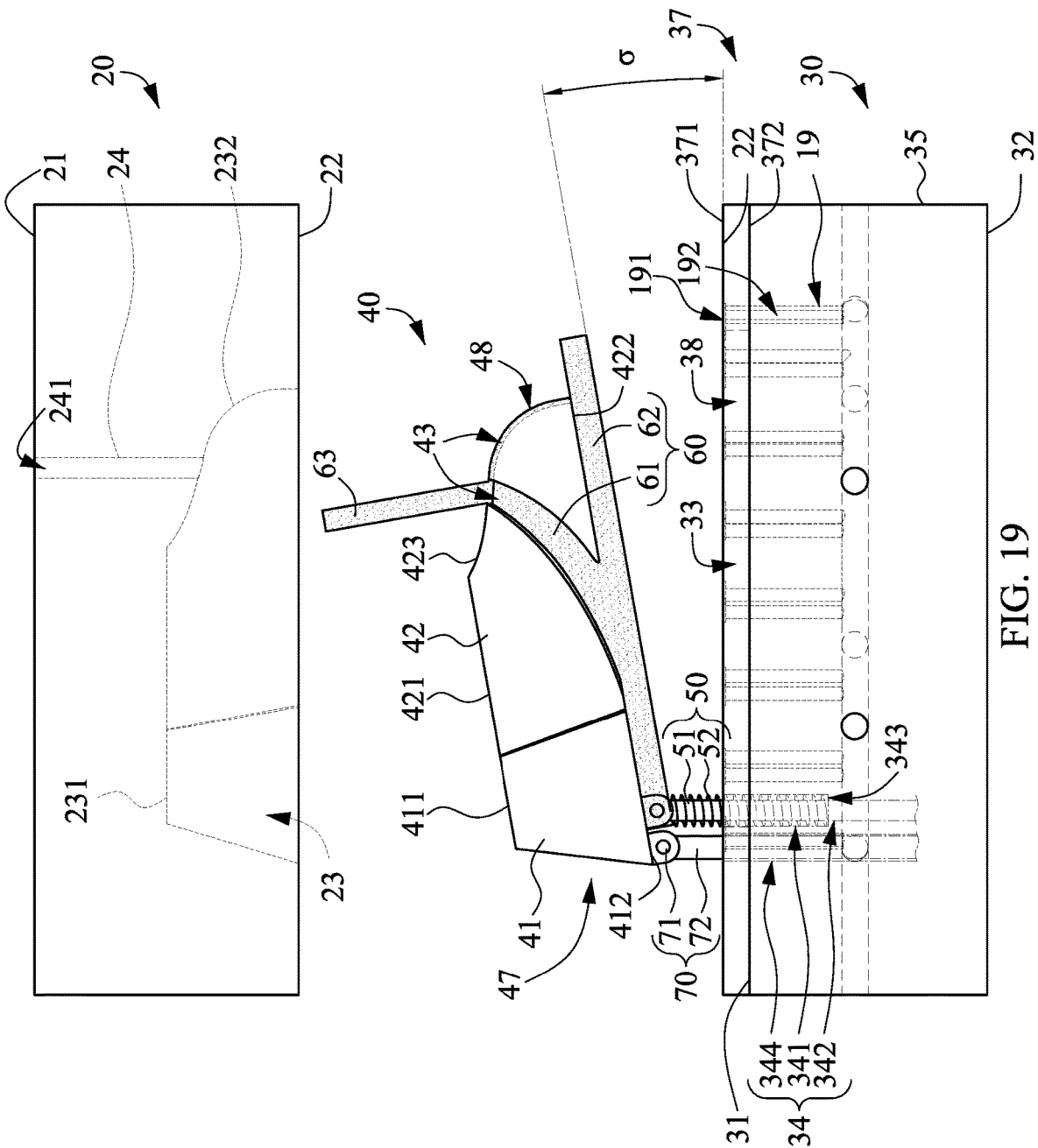

Referring to FIG. 19, in some embodiments, the middle mold 40 and the article 60 are tilted relative to the lower mold 30 and the mold frame 37. In some embodiments, the middle mold 40 rotates around the fulcrum 71 to tilt the middle mold 40, and the middle mold 40 has an angle σ relative to the lower mold 30 and the mold frame 37. The angle σ ranges between 0 and 90 degree. In some embodiments, the angle σ ranges between 20 and 70 degree. In some embodiments, the middle mold 40 and the article 60 are tilted relative to the lower mold 30 and the mold frame 37 when the gap G2 between the mold frame 37 and the middle mold 40 is equal to or greater than zero. In some embodiments, the middle mold 40 and the article 60 are tilted when the fulcrum 71 is disposed within the lower mold cavity 33 and surrounded by the mold frame 37. In some embodiments, the middle mold 40 and the article 60 are tilted when the fulcrum 71 is disposed over the lower mold 30 and the mold frame 37.

Figure 20:
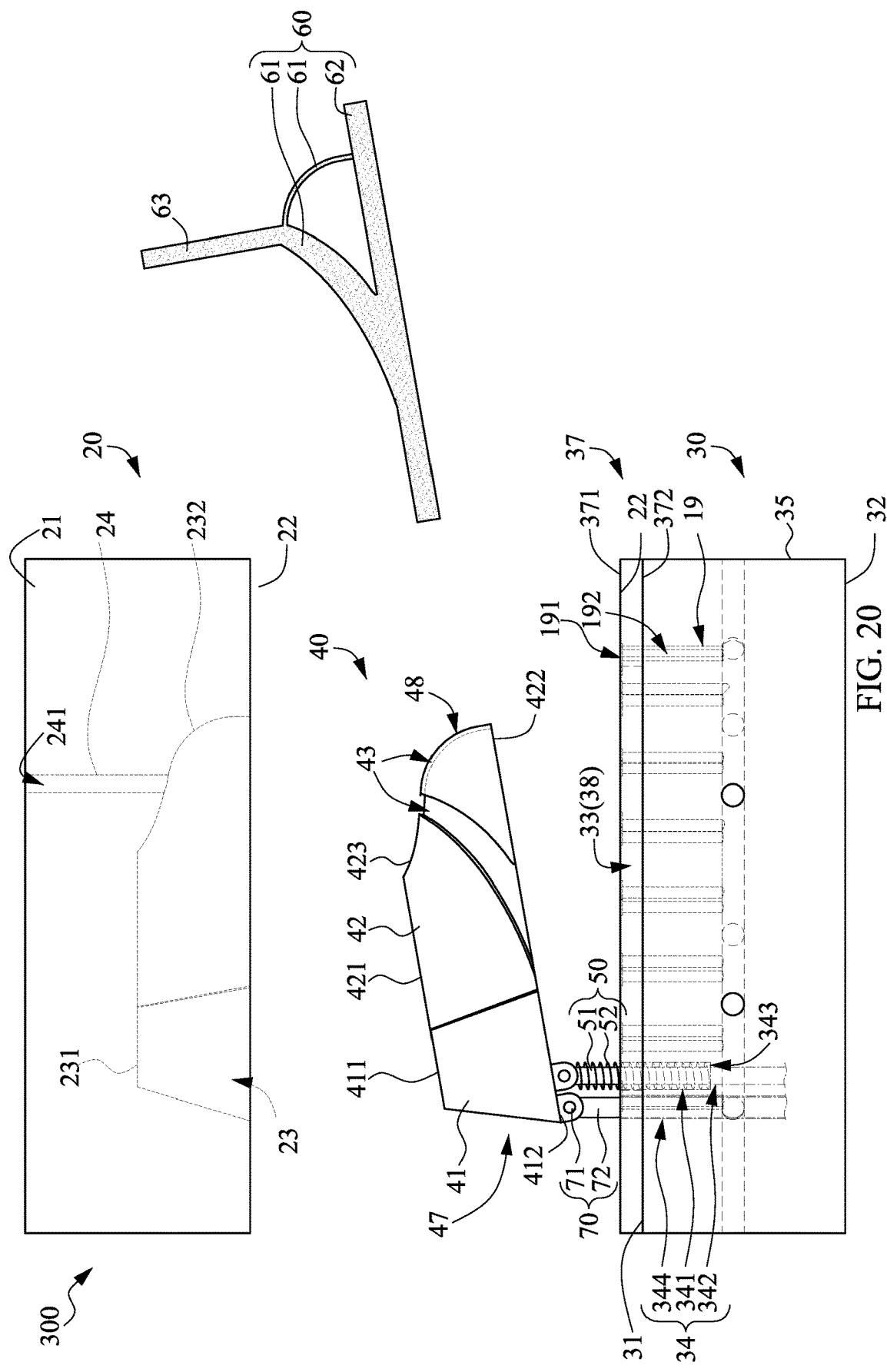

Referring to FIG. 20, in some embodiments, after tilting the middle mold 40, the article 60 is detached from the middle mold 40. In some embodiments, the article 60 is detached from the second end 48 of the middle mold 40. In some embodiments, the tilted middle mold 40 and the gap G2 between the top surface 371 of the mold frame 37 and the bottom surface 412 of the middle mold 40 facilitates the detachment of the article 60. In some embodiments, the additional pin 63 is removed from the article 60 so as to obtain the article 60 as shown in FIG. 8.

Figure 21:
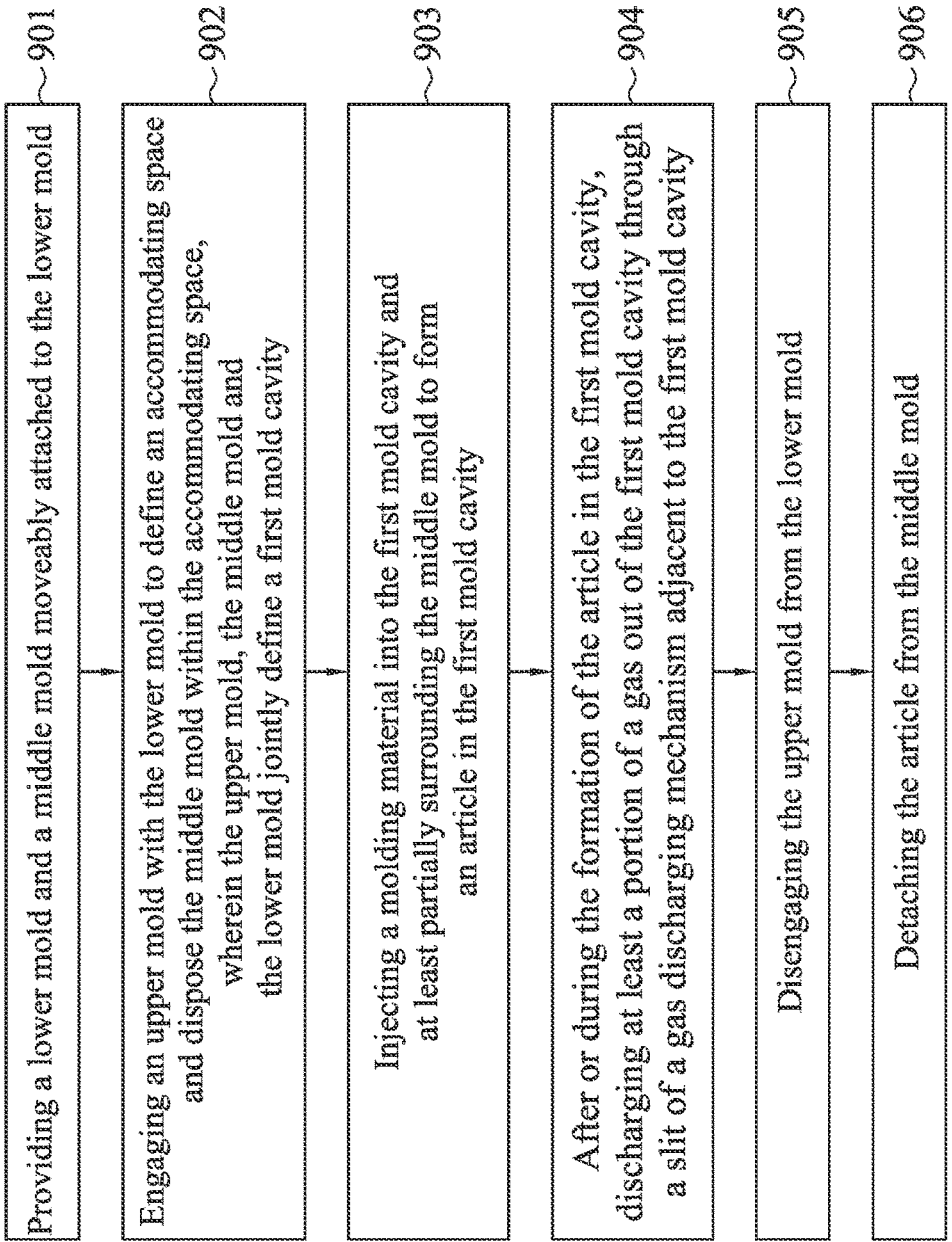
FIG. 21 is a flow chart illustrating a molding method according to some embodiments of the present invention.

FIG. 21 is a flowchart showing a molding method 900 in accordance with some embodiments of the present disclosure. In some embodiments, the method 900 is for manufacturing the article 60 shown in FIG. 12. The method 900 includes several operations: (901) providing a lower mold and a middle mold moveably attached to the lower mold; (902) engaging an upper mold with the lower mold to define an accommodating space and dispose the middle mold within the accommodating space, wherein the upper mold, the middle mold and the lower mold jointly define a first mold cavity; (903) injecting a molding material into the first mold cavity and at least partially surrounding the middle mold to form an article in the first mold cavity; (904) after or during the formation of the article in the first mold cavity, discharging at least a portion of a gas out of the first mold cavity through a slit of a gas discharging mechanism adjacent to the first mold cavity; (905) disengaging the upper mold from the lower mold; and (906) detaching the article from the middle mold.

Figure 22:
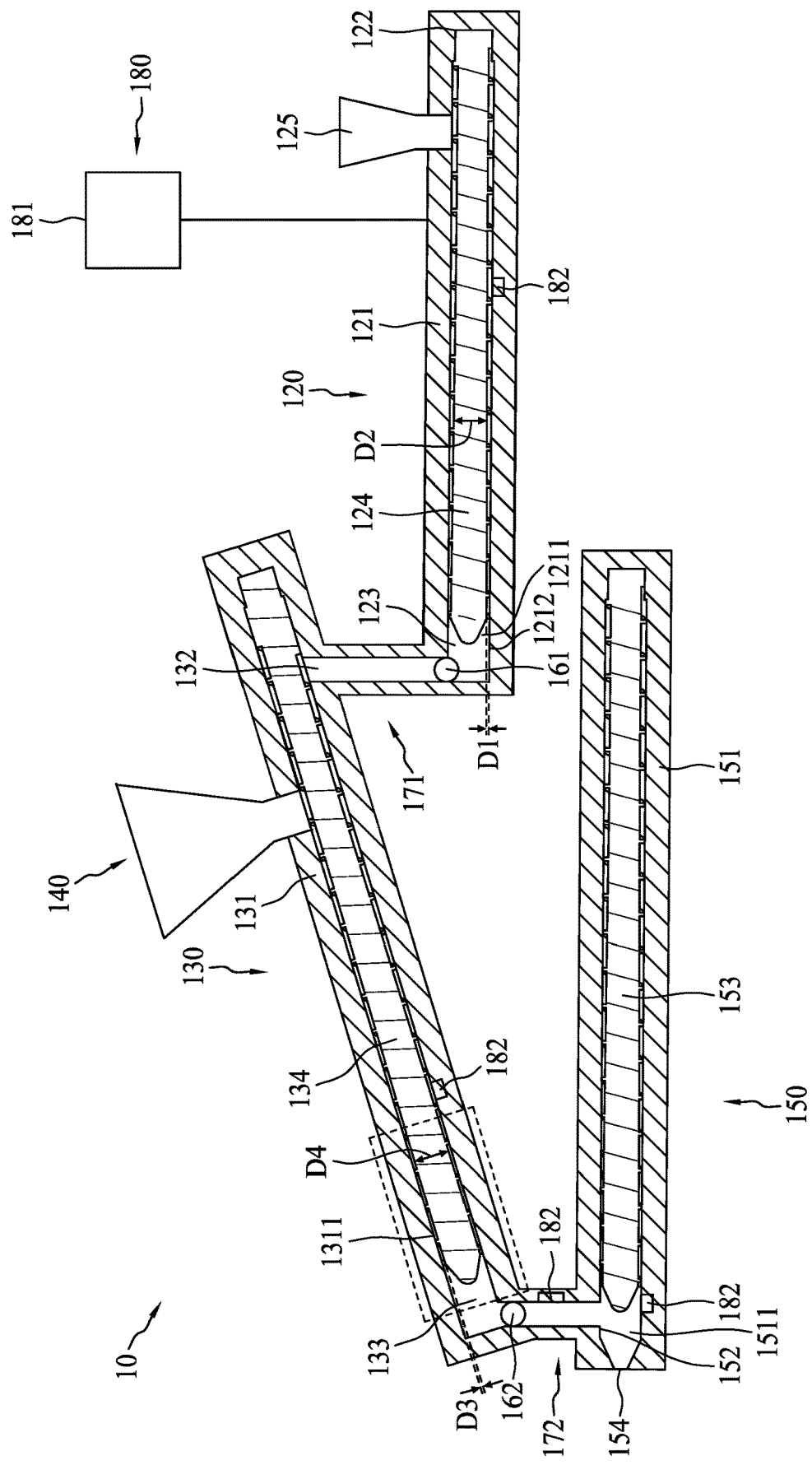
FIG. 22 is a schematic diagram of an extruding system used in a molding method according to some embodiments of the present invention.

In some embodiments, the method 100 includes injecting the molding material 60a from the extruding system 10 into the discharging channel 10a. FIG. 22 is a schematic diagram of the extruding system 10 according to aspects of the present disclosure in some embodiments. The extruding system 10 includes a melting unit 120 and a mixing unit 130. In some embodiments, the extruding system 10 includes the melting unit 120, the mixing unit 130, a blowing agent supply unit 140, an injection unit 150, a first flow control element 161, a second flow control element 162, and a monitoring module 180.

In some embodiments, referring to FIG. 22, the melting unit 120 is configured to convey the polymeric material. In some embodiments, the melting unit 120 includes a pressing cartridge 121, a first feeding passage 122, a first discharging passage 123, and a pushing member 124. In some embodiments, the melting unit 120 further includes a feeding hopper 125.

In some embodiments, the first feeding passage 122 and the first discharging passage 123 are respectively disposed at two ends of the pressing cartridge 121. In some embodiments, the first feeding passage 122 communicates with an inner space 1211 of the pressing cartridge 121, and the first discharging passage 123 communicates with an external space of the pressing cartridge 121, wherein the first feeding passage 122 is configured to deliver the polymeric material to the inner space 1211 of the pressing cartridge 121. In some embodiments, the feeding hopper 125 is configured to deliver a polymeric material to the inner space 1211 of the pressing cartridge 121 through the first feeding passage 122.

The pushing member 124 is configured to convey the polymeric material from the first feeding passage 122 to the first discharging passage 123. In some embodiments, the pushing member 124 is disposed in the inner space 1211 of the pressing cartridge 121. In some embodiments, the pushing member 124 is disposed in the inner space 1211 of the pressing cartridge 121 between the first feeding passage 122 and the first discharging passage 123, and is used to force the polymeric material toward the first discharging passage 123. In some embodiments, the pushing member 124 is rotatable relative to the pressing cartridge 121. In some embodiments, the polymeric material is conveyed from the first feeding passage 122 to the first discharging passage 123 by rotation of the pushing member 124. In some embodiments, the pushing member 124 is immovable in a direction parallel to the longitudinal axis of the pressing cartridge 121.

In some embodiments, a length of the pushing member 124 extends along a length of the pressing cartridge 121, and a ratio of a shortest distance D1 between an inner sidewall 1212 of the pressing cartridge 121 and the pushing member 124 and a diameter D2 of the pushing member 124 is in a range of about 1:1500 to about 1:4500, and the polymeric material melted by the melting unit 120 may be uniformed. In some embodiments, a shortest distance D1 between an inner sidewall 1212 of the pressing cartridge 121 and the pushing member 124 is substantially equal to or less than 0.3 mm. In some embodiments, the shortest distance D1 between the inner sidewall 1212 of the pressing cartridge 121 and the pushing member 124 ranges between 0.01 and 0.05 mm.

The mixing unit 130 is configured to receive the polymeric material from the melting unit 120 and configured to mix the polymeric material with a blowing agent and to form a mixture of the polymeric material and the blowing agent. The mixing unit 130 includes a hollow mixing cartridge 131, a second feeding passage 132, a second discharging passage 133, and a mixing rotor 134.

The second feeding passage 132 and the second discharging passage 133 are respectively disposed at two ends of the mixing cartridge 131. In some embodiments, the second feeding passage 132 is configured to deliver the polymeric material. In some embodiments, the second discharging passage 133 is configured to discharge the mixture.

The mixing rotor 134 is configured to mix the polymeric material with the blowing agent to form a mixture in the mixing cartridge 131. In some embodiments, the mixing rotor 134 is disposed in the mixing cartridge 131. In some embodiments, the mixing rotor 134 is disposed in the mixing cartridge 131 between the second feeding passage 132 and the second discharging passage 133, so as to agitate the mixture in the mixing cartridge. The mixing rotor 134 is rotatable to mix the polymeric material with the blowing agent and to convey the mixture of the polymeric material and the blowing agent from the second feeding passage 132 to the second discharging passage 133. In some embodiments, the mixing rotor 134 is immovable in a direction parallel to the longitudinal axis of the mixing cartridge 131.

In some embodiments, a length of the mixing rotor 134 extends along a length of the hollow mixing cartridge 131, and a ratio of a shortest distance D3 between an inner sidewall 1311 of the hollow mixing cartridge 131 and the mixing rotor 134 and a diameter D4 of the mixing rotor 134 is in a range of about 1:1500 to about 1:4500, and the mixture prepared by the extruding system 10 may be even and uniformed. In some embodiments, the mixture may be divided in to a plurality of portions, and a ratio of the blowing agent to the polymeric material of each portion of the mixture prepared by the extruding system 10 is substantially constant. In some embodiments, a ratio of the polymeric material to the blowing agent in a first portion of the mixture is substantially equal to a ratio of the polymeric material to the blowing agent in a second portion of the mixture. In some embodiments, the shortest distance D3 between the inner sidewall 1311 of the hollow mixing cartridge 131 and the mixing rotor 134 is substantially equal to or less than 0.3 mm. In some embodiments, the shortest distance D3 between the inner sidewall 1311 of the hollow mixing cartridge 131 and the mixing rotor 134 ranges between 0.01 and 0.09 mm. In some embodiments, the diameter D2 of the pushing member 124 and the diameter D4 of the mixing rotor 134 may be same or different. In some embodiments, according to the different properties of the polymeric material and the mixture, the diameter D2 of the pushing member 124 is different from the diameter D4 of the mixing rotor 134.

Figure 23:
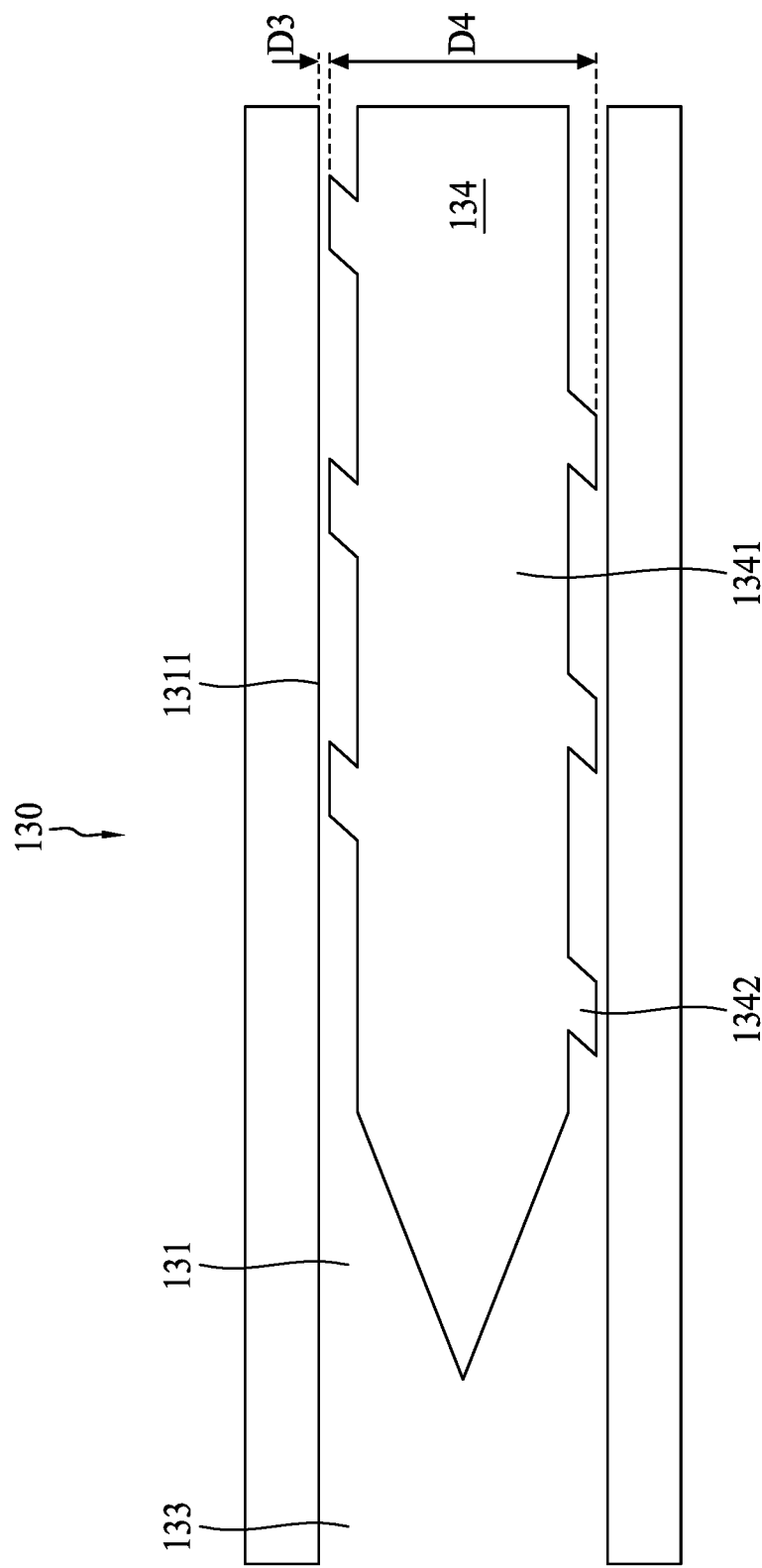
FIG. 23 is an enlarged view of a portion of an extruding system enclosed by a dash line in FIG. 22 according to one embodiment of the present invention.

FIG. 23 is an enlarged view of a portion of the extruding system according to aspects of the present disclosure in some embodiments. To enable the melted polymeric material and the blowing agent to mix uniformly in the mixing cartridge 131, in some embodiments, referring to FIGS. 22 and 23, the mixing rotor 134 further includes a column-like body 1341 in a cylindrical shape and rotatably disposed in the mixing cartridge 131, and a groove portion 1342 annularly arranged on the periphery of the column-like body 1341. Therefore, when the column-like body 1341 rotates, the polymeric material and the blowing agent are agitated by the groove portion 1342, so as to achieve a desired mixing effect. In some embodiments, the shortest distance D3 is a shortest distance between the groove portion 1342 and the inner sidewall 1311 of the hollow mixing cartridge 131.

In some embodiments, when the shortest distance D3 is a shortest distance between the groove portion 1342 and the inner sidewall 1311 of the hollow mixing cartridge 131, the shortest distance D3 ranges between 0.01 and 0.09 mm. In some embodiments, the diameter D4 of the mixing rotor 134 ranges between the 45 to 75 mm. Table 1 lists the shortest distance D3, the diameter D4 and the corresponding ratio of the a shortest distance D3 distance between the groove portion 1342 and the inner sidewall 1311 of the hollow mixing cartridge 131 and a diameter D4 of the mixing rotor 134.

TABLE 1

| | diameter D4 (mm) | | | | | | | |
|---|---|---|---|---|---|---|---|---|
| | 45 | | 55 | | 65 | | 75 | |
| | shortest distance D3 (mm) | | | | | | | |
| | 0.01 | 0.02 | 0.02 | 0.03 | 0.03 | 0.04 | 0.04 | 0.05 |
| D4/D3 | 4500 | 2250 | 2750 | 1833 | 2167 | 1625 | 1875 | 1500 |

Figure 24:
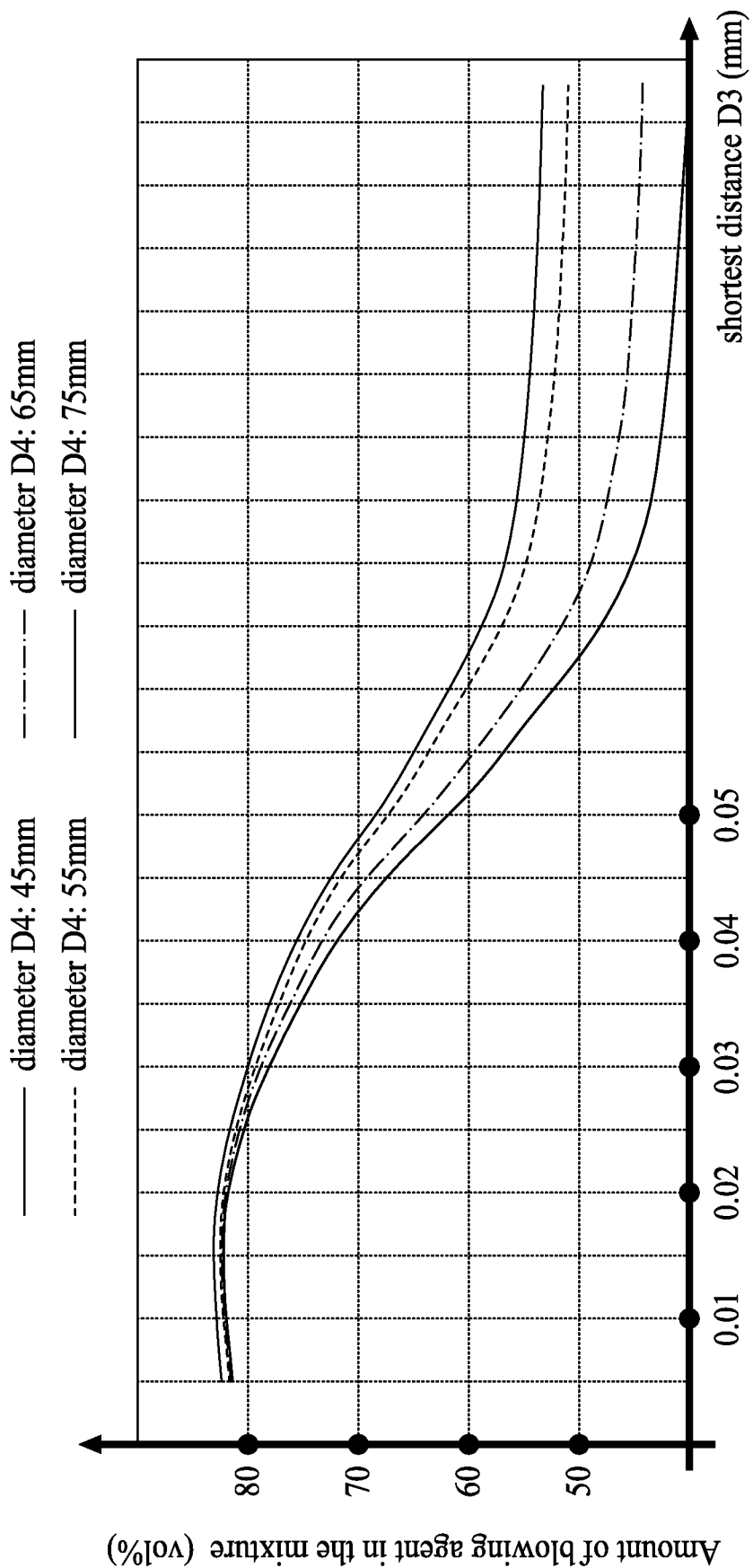
FIG. 24 is a chart illustrating the behavior of the amount of blowing agent in the mixture versus the shortest distance according to one embodiment of the present invention.

In some embodiments, when the shortest distance D3 is substantially less than 0.01 mm, the blowing agent in a predetermined amount of the mixture is substantially greater than 0.8 per $cm^3$, as shown in FIG. 24. In some embodiments, if the blowing agent in the predetermined amount of the mixture is substantially greater than 0.8 per $cm^3$, a bubble density in the predetermined amount of the mixture after foaming is substantially greater than 180000 per $cm^3$.

Figure 25:
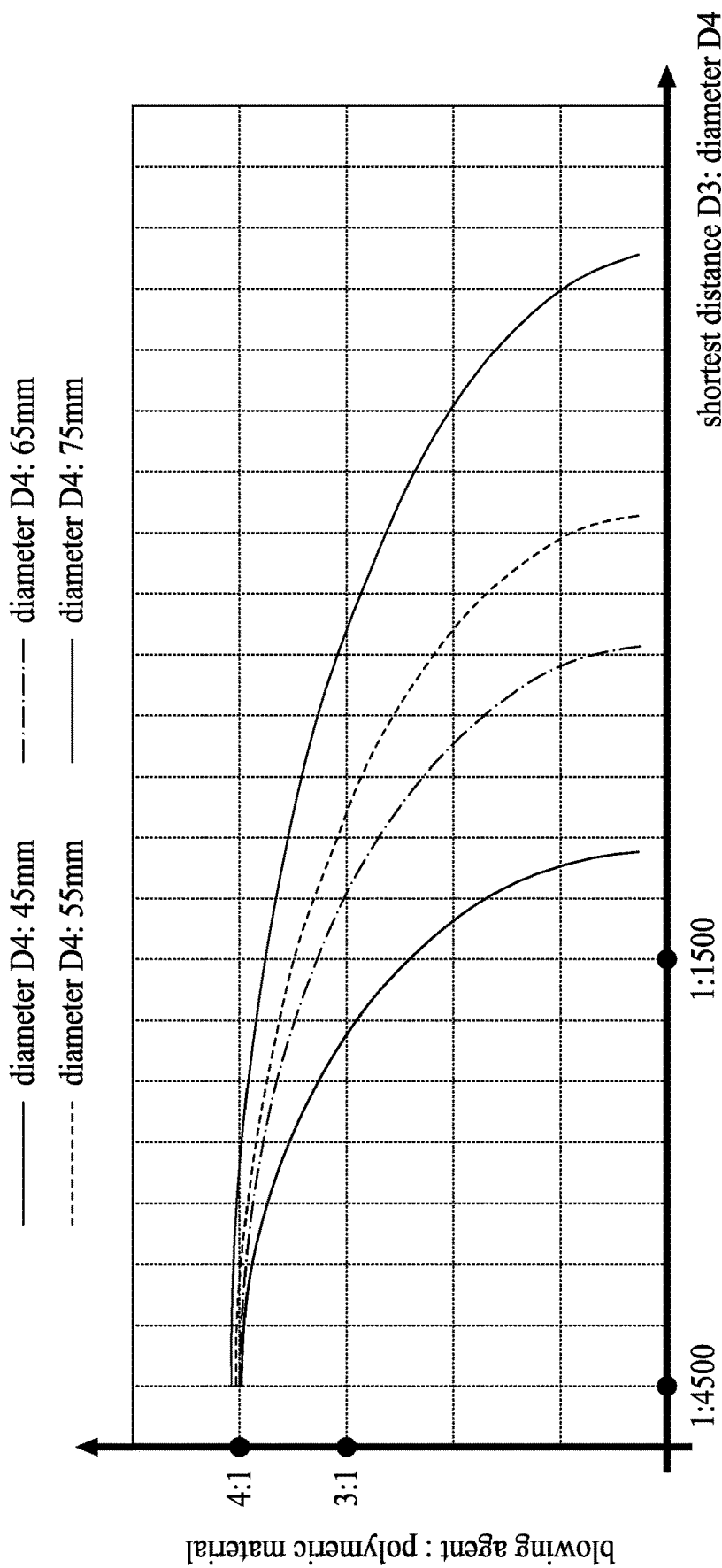
FIG. 25 is a chart illustrating the behavior of the ratio of the blowing agent to the polymeric material versus the ratio of the shortest distance to the diameter of the mixing rotor according to one embodiment of the present invention.

In some embodiments, when the ratio of the shortest distance D3 to the diameter D4 ranges between 1:1500 and 1:4500, an evenness of the blowing agent to the polymeric material is optimized. In other words, a mixing of the blowing agent and the polymeric material by the mixing rotor 134 is even and uniform. In some embodiments, when the ratio of the shortest distance D3 to the diameter D4 ranges between 1:1500 and 1:4500, a ratio of the blowing agent to the polymeric material in a predetermined amount of the mixture ranges between 4:1 to 3:1 as shown in FIG. 25. In some embodiments, the ratio of the blowing agent to the polymeric material in the predetermined amount of the mixture is about 1:1. In some embodiments, if the ratio of the blowing agent to the polymeric material in the predetermined amount of the mixture ranges between 4:1 and 3:1 ratio of bubbles to the polymeric material in the predetermined amount of the mixture after foaming also ranges between 4:1 and 3:1. In some embodiments, the ratio of the bubbles to the polymeric material in the predetermined amount of the mixture after foaming is about 4:1.

In some embodiments, referring back to FIG. 22, the melting unit 120 includes a hollow pressing cartridge 121 configured to accommodate the polymeric material and having a first pressure, and the mixing unit 130 includes a hollow mixing cartridge 131 having a second pressure. In some embodiments, in order to prevent backflow, the first pressure is greater than the second pressure. In some embodiments, the polymeric material is drawn from the melting unit 120 toward the mixing unit 130 by the difference between the first pressure and the second pressure.

The blowing agent supply unit 140 is connected to the mixing unit 130 and configured to convey the blowing agent into the mixing unit 130. In some embodiments, the blowing agent supply unit 140 is positioned between the first flow control element 161 and the second flow control element 162. In some embodiments, the blowing agent supply unit 140 is positioned between the second feeding passages 132 and second discharging passage 133. In some embodiments, the blowing agent supply unit 140 is disposed proximal to the first flow control element 161 and distal to the second flow control element 162. In some embodiments, the blowing agent supply unit 140 is disposed proximal to the second feeding passage 132 and distal to the second discharging passage 133.

In some embodiments, a blowing agent source (not shown) is connected to the blowing agent supply unit 140 and is configured to supply any type of blowing agent known to those of ordinary skill in the art. In some embodiments, the blowing agent is in the supercritical fluid state after being introduced into the mixing unit 130 by the blowing agent supply unit 140.

In some embodiments, the first flow control element 161 is disposed at a first port 171 that connects the melting unit 120 to the mixing unit 130. The first port 171 is configured to introduce the polymeric material from the melting unit 120 into the mixing unit 130. The first port 171 is located between the melting unit 120 and the mixing unit 130. In some embodiments, the first port 171 is configured to introduce the polymeric material from the pressing cartridge 121 of the melting unit 120 into the mixing cartridge 131 of the mixing unit 130. In some embodiments, the polymeric material can be conveyed and/or drawn from the melting unit 120 to the mixing unit 130 through the first port 171 by a pressure difference between the first pressure and the second pressure.

In some embodiments, the first flow control element 161 is disposed between the melting unit 120 and the mixing unit 130 and is configured to control flow of the polymeric material from the melting unit 120 to the mixing unit 130. The first flow control element 161 may be a valve, a movable cover or the like.

In some embodiments, the first flow control element 161 is configured to switch between an open configuration and a closed configuration. The open configuration of the first flow control element 161 allows the polymeric material to flow from the melting unit 120 into the mixing unit 130, and the closed configuration of the first flow control element 161 prevents the polymeric material from flowing from the mixing unit 130 back to the melting unit 120.

In some embodiments, the first flow control element 161 is configured to maintain a pressure difference between the melting unit 120 and the mixing unit 130. In some embodiments, the first flow control element 161 is configured to maintain a pressure difference between the melting unit 120 and the mixing unit 130 by switching between the open configuration and the closed configuration, so that the polymeric material is not able to flow from the mixing cartridge 131 of the mixing unit 130 back to the pressing cartridge 121 of the melting unit 120. In some embodiments, the first flow control element 161 is configured to adjust the first pressure and/or the second pressure in order to maintain the pressure difference between the first pressure and the second pressure. In some embodiments, the first flow control element 161 is in the closed configuration when the first pressure is similar to the second pressure.

In some embodiments, the injection unit 150 is configured to receive the mixture discharged from the second discharging passage 133 of the mixing unit 130 and to discharge the mixture out of the injection unit 150. In some embodiments, the injection unit 150 is configured to inject the mixture, and the discharging channel 10a is communicable with the injection unit 150.

In some embodiments, the injection unit 150 includes a hollow metering cartridge 151 configured to accommodate the mixture. The metering cartridge 151 has a hollow inner space 1511, wherein the inner space 1511 is in communication with the second discharging passage 133 and configured to accommodate the mixture. The injection unit 150 further includes a connecting passage 152 in communication with the inner space 1511 of the metering cartridge 151 and a discharging member 153 slidably disposed in the inner space 1511 of the metering cartridge 151 and configured to discharge the mixture out of the metering cartridge 151 through an outlet 154. In some embodiments, the mixture is flowed from the injection unit 150 into the discharging channel 10a.

In some embodiments, the discharging channel 10a is a mold of the molding device 200, 300 is connected to the outlet 154. In some embodiments, the discharging member 153 is movable in a direction parallel to the longitudinal axis of the metering cartridge 151 to inject the mixture accumulated in the metering cartridge 151 into the mold through the outlet 154. The mixture is injected from the metering cartridge 151 into the molding device 200, 300 or the discharging channel 10a by a pushing force from the discharging member 153. In some embodiments, the discharging member 153 is not rotatable relative to the metering cartridge 151.

In some embodiments, the metering cartridge 151 has a third pressure. In some embodiments, in order to prevent backflow, the second pressure of the mixing cartridge 131 is greater than the third pressure.

In some embodiments, the second flow control element 162 is disposed at a second port 172 that connects the mixing unit 130 to the injection unit 150. The second port 172 is configured to introduce the mixture from the mixing unit 130 into the injection unit 150. The second port 172 is located between the mixing unit 130 and the injection unit 150. In some embodiments, the second port 172 is configured to introduce the mixture from the mixing cartridge 131 of the mixing unit 130 into the metering cartridge 151 of the injection unit 150. In some embodiments, the mixture can be conveyed and/or drawn from the mixing unit 130 to the injection unit 150 through the second port 172 by a pressure difference between the second pressure and the third pressure.

In some embodiments, the second flow control element 162 is disposed between the mixing unit 130 and the injection unit 150 and is configured to control flow of the mixture from the mixing unit 130 to the injection unit 150. The second flow control element 162 may be a valve, a movable cover or the like.

In some embodiments, the second flow control element 162 is configured to switch between an open configuration and a closed configuration, wherein the open configuration allows the mixture to flow from the mixing unit 130 into the injection unit 150 and the closed configuration prevents the mixture from flowing from the injection unit 150 back to the mixing unit 130.

In some embodiments, the second flow control element 162 is configured to maintain a pressure difference between the mixing unit 130 and the injection unit 150. In some embodiments, the second flow control element 162 is configured to maintain a pressure difference between the mixing unit 130 and the injection unit 150 by switching between the open configuration and the closed configuration, so that the mixture is not able to flow from the metering cartridge 151 of the injection unit 150 back to the mixing cartridge 131 of the mixing unit 130. In some embodiments, the second flow control element 162 is configured to adjust the second pressure and/or the third pressure in order to maintain the pressure difference between the second pressure and the third pressure.

In some embodiments, the blowing agent supply unit 140 is positioned between the first port 171 and second port 172. In some embodiments, the blowing agent supply unit 140 is disposed proximal to the first port 171 and distal to the second port 172.

The monitoring module 180 is configured to monitor the extruding system 10 in real time. In some embodiments, the monitoring module 180 includes a central processor 181 and a sensor 182 electrically connected to or communicable with the central processor 181. In some embodiments, a plurality of sensors 182 are placed throughout the extruding system 10 and configured to sense at least one processing condition (e.g., a flow rate or viscosity of the polymeric material along the melting unit 120, an amount of the mixture accumulated in the injection unit 150, the first pressure inside the melting unit 120, the second pressure inside the mixing unit 130, the third pressure inside the injection unit 150, the pressure difference between the first pressure and the second pressure, the pressure difference between the second pressure and the third pressure, temperatures at each unit, rotational speeds of the pushing member 124 and the mixing rotor 134, or flow rate and amount of the blowing agent through the blowing agent inlet 140) at a predetermined position of the extruding system 10 (e.g., the melting unit 120, the mixing unit 130, the injection unit 150, the blowing agent inlet 140, the first port 171, the second port 172, the outlet 154, or the first and second flow control elements 161, 162). For example, at least one sensor 182 is installed at each unit for sensing the processing condition at the corresponding unit.

In some embodiments, the sensor 182 is configured to detect the processing condition and transmit a signal or data based on the processing condition detected to the central processor 181 for further analysis. The number of sensors 182 may be adjusted according to requirements.

In some embodiments, the monitoring module 180 can automatically monitor and instantly adjust the processing conditions at the corresponding positions of the extruding system 10 in accordance with the processing conditions sensed by the sensors 182 and/or the analysis of the central processor 181. The sensor 182 is not limited to any particular type, as long as it can sense the processing condition and provide information after sensing. The central processor 181 changes the processing condition with the information, so as to adjust the processing condition in each unit, in such a manner that the mixture thus obtained has the desired predetermined property.

An aspect of this disclosure relates to a molding device. The molding device includes an upper mold; a lower mold disposed opposite to the upper mold; a middle mold disposed between the upper mold and the lower mold, and being moveably attached to the lower mold; a position control mechanism attached to the middle mold and configured to move the middle mold relative to the upper mold and the lower mold; and a gas discharging mechanism disposed in the lower mold, the gas discharging mechanism includes a gas conduit disposed adjacent to a mold cavity and defined by the lower mold, and a slit jointly defined by the upper mold and the lower mold when the molding device is in a closed configuration, and the slit is in communication with the mold cavity and the gas conduit.

In some embodiments, the middle mold includes a first end and a second end opposite to the first end, the tilt mechanism is attached to the first end of the middle mold, and configured to incline the middle mold whereby the second end is higher than the first end. In some embodiments, the second end of the middle mold includes a shoe last. In some embodiments, the position control mechanism attaches to the first end of the middle mold and includes bar member connected to the middle mold and a biasing member for controlling a movement of the bar member. In some embodiments, the molding device further includes a tilt mechanism attached to the middle mold and configured to tilt the middle mold relative to the lower mold. In some embodiments, the tilt mechanism includes a fulcrum for pivoting the middle mold. In some embodiments, the slit is indented from a top surface of the lower mold. In some embodiments, a height of the slit is less than a diameter of the gas conduit. In some embodiments, the molding device further includes a platform disposed under the lower mold, wherein the platform includes a first opening extending through the platform; and a plunger disposed under the platform, wherein the plunger includes a base and a rod, the rod is extendable through the first opening toward the molding device and retractable toward the base. In some embodiments, the lower mold includes a second opening configured to receive at least a portion of the rod, and the second opening is overlapped with the first opening from a top view.

An aspect of this disclosure relates to a molding method. The molding method includes providing a lower mold and a middle mold moveably attached to the lower mold; engaging an upper mold with the lower mold to define an accommodating space and dispose the middle mold within the accommodating space, wherein the upper mold, the middle mold and the lower mold jointly define a first mold cavity; injecting a molding material into the first mold cavity and at least partially surrounding the middle mold to form an article in the first mold cavity; after the article is formed in the first mold cavity, discharging at least a portion of a gas out of the first mold cavity through a slit of a gas discharging mechanism adjacent to the first mold cavity; disengaging the upper mold from the lower mold; and detaching the article from the middle mold.

In some embodiments, the method further includes lifting the middle mold and the article from the lower mold before tilting the middle mold, wherein the article is held by the middle mold. In some embodiments, the method further includes tilting the middle mold and the article relative to the lower mold. In some embodiments, the middle mold includes a first end and a second end opposite to the first end, and the first end is lower than the second end when the middle mold is tilted. In some embodiments, the article is detachable from the second end of the middle mold. In some embodiments, the method further includes after the article is formed in the first mold cavity, separating the upper mold and the lower mold to form a second mold cavity and discharge at least a portion of a gas out of the second mold cavity. In some embodiments, the method further includes after the article is formed in the first mold cavity, discharging at least a portion of the gas out of the first mold cavity to a gas conduit of the gas discharging mechanism through the slit between the first mold cavity and the gas conduit.

In some embodiments, the method further includes disposing the upper mold, the middle mold and the lower mold over a platform including a first opening extending through the platform; disposing a plunger under the lower mold and the platform, wherein the plunger includes a base and a rod extendable toward the lower mold and retractable toward the base; and applying a plunging force to the lower mold and the upper mold by extending the rod through the first opening towards the upper mold during the injection of the molding material into the first mold cavity. In some embodiments, the method further includes retracting the rod towards the base after the injection of the molding material to discharge at least a portion of a gas out from the first mold cavity. In some embodiments, the rod contacts the lower mold during the application of the plunging force.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. A molding device, comprising:
  a first mold;
  a second mold disposed opposite to the first mold in a first direction;
  a third mold disposed between the first mold and the second mold, and being moveably attached to the second mold;
  a tilt mechanism attached to the third mold and configured to tilt the third mold relative to the second mold; and
  a gas discharging mechanism disposed adjacent to a mold cavity defined by the first mold, the third mold and the second mold, wherein the gas discharging mechanism includes a gas conduit and a slit communicable with the mold cavity and the gas conduit and jointly defined by the first mold and the second mold when the molding device is in a closed configuration,
  wherein the third mold includes a first end and a second end opposite to the first end, the first end of the third mold is pivotally attached to the tilt mechanism, the third mold is tiltable by the tilt mechanism when the molding device is in an open configuration, and
  the second mold includes a hole structure extending along the first direction and accommodating at least a portion of the tilt mechanism.

2. The molding device of claim 1, further comprising:
  a position control mechanism attached to the third mold and configured to move the third mold relative to the first mold and the second mold,
  wherein position control mechanism is disposed adjacent to the tilt mechanism, and is at least partially disposed within the hole structure.

3. The molding device of claim 2, further comprising:
  a mold frame surrounding the third mold and disposed between the first mold and the second mold,
  wherein a portion of the third mold, a portion of the position control mechanism and a portion of the tilt mechanism are surrounded by the mold frame.

4. The molding device of claim 3, wherein the gas discharging mechanism is arranged in the mold frame and the second mold.

5. The molding device of claim 3, wherein the first mold is placed on and engaged with the mold frame, and the mold frame is placed on and engaged with the second mold.

6. The molding device of claim 3, wherein the slit is indented from a top surface of the mold frame, the top surface of the mold frame faces the first mold, and the slit is jointly defined by the first mold and the mold frame when the molding device is in the closed configuration.

7. The molding device of claim 2, wherein the second mold further includes a hole structure including a first hole and a second hole communicable with the first hole, a portion of the position control mechanism is accommodated in the first hole and the second hole, and a size of the second hole is smaller than a size of the first hole.

8. The molding device of claim 1, further comprising a feeding port extending through the first mold, wherein the second end of the third mold includes a shoe last, and the feeding port is disposed above the shoe last.

9. The molding device of claim 1, wherein the third mold is not tiltable by the tilt mechanism when the molding device is in the closed configuration.

10. The molding device of claim 9, wherein the tilt mechanism includes a fulcrum for pivoting the third mold, and a bar member disposed in the third hole and attached to the fulcrum.

\* \* \* \* \*